(12) United States Patent
Kim et al.

(10) Patent No.: US 12,219,079 B2
(45) Date of Patent: Feb. 4, 2025

(54) METHOD FOR PROVIDING IMAGE AND ELECTRONIC DEVICE SUPPORTING THE SAME

(71) Applicant: Samsung Electronics Co., Ltd., Suwon-si (KR)

(72) Inventors: Ildo Kim, Suwon-si (KR); Jonghoon Won, Suwon-si (KR); Jinhyun Kim, Suwon-si (KR); Sungoh Kim, Suwon-si (KR); Jiwoo Kim, Suwon-si (KR); Valeriy Prushinskiy, Suwon-si (KR); Hyungsok Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 17/972,004

(22) Filed: Oct. 24, 2022

(65) Prior Publication Data
US 2023/0141559 A1    May 11, 2023

Related U.S. Application Data

(63) Continuation of application No. PCT/KR2022/015299, filed on Oct. 11, 2022.

(30) Foreign Application Priority Data

Nov. 5, 2021 (KR) .......................... 10-2021-0151773

(51) Int. Cl.
*H04M 1/02* (2006.01)
*G06F 1/16* (2006.01)
(Continued)

(52) U.S. Cl.
CPC ........ *H04M 1/0268* (2013.01); *G06F 1/1624* (2013.01); *G06F 1/1677* (2013.01);
(Continued)

(58) Field of Classification Search
CPC ............. H04M 1/0268; H04M 1/0235; H04M 1/0241; G06F 1/1624; G06F 1/1677;
(Continued)

(56) References Cited

U.S. PATENT DOCUMENTS

2012/0133822 A1* 5/2012 Kawai ................. H04N 23/675
348/347
2014/0002430 A1    1/2014 Kwack et al.
(Continued)

FOREIGN PATENT DOCUMENTS

JP          2006-229906 A        8/2006
KR    10-2014-0001490 A        1/2014
(Continued)

OTHER PUBLICATIONS

International Search report dated Jan. 12, 2023, issued in International Patent Application No. PCT/KR2022/015299.
(Continued)

*Primary Examiner* — Yosef K Laekemariam
(74) *Attorney, Agent, or Firm* — Jefferson IP Law, LLP

(57) ABSTRACT

An electronic device is provided. The electronic device includes a flexible display in which a region exposed to an outside is reduced as the flexible display is drawn into the electronic device and the region exposed to the outside is expanded as the flexible display is drawn out of the electronic device, a camera module including an image sensor, at least one sensor, and at least one processor, wherein the at least one processor is configured to acquire an image through the image sensor, identify a region of the flexible display exposed to the outside, through the at least one sensor, determine, within the image, an image part corresponding to the identified region of the flexible display, determine, within the determined image part, a region for performing at least one function related to the image, and
(Continued)

perform the at least one function, based on the determined region.

20 Claims, 16 Drawing Sheets

(51) Int. Cl.
  *G06F 3/0487* (2013.01)
  *G09F 9/30* (2006.01)
  *H04N 23/53* (2023.01)
  *H04N 23/611* (2023.01)
  *H04N 23/63* (2023.01)

(52) U.S. Cl.
  CPC .......... *G06F 1/1686* (2013.01); *G06F 3/0487* (2013.01); *G09F 9/301* (2013.01); *H04N 23/53* (2023.01); *H04N 23/611* (2023.01); *H04N 23/632* (2023.01); *H04N 23/635* (2023.01)

(58) Field of Classification Search
  CPC ........ G06F 1/1686; G06F 3/0487; G06F 1/16; G06F 1/1652; G06F 3/0481; G06F 3/0484; G06F 3/14; G09F 9/301; H04N 23/53; H04N 23/611; H04N 23/632; H04N 23/635
  See application file for complete search history.

(56) References Cited

U.S. PATENT DOCUMENTS

| | | |
|---|---|---|
| 2015/0029229 A1 | 1/2015 | Voutsas |
| 2015/0220119 A1 | 8/2015 | Seo et al. |
| 2015/0350533 A1 | 12/2015 | Harris et al. |
| 2016/0057356 A1* | 2/2016 | Nagano .................. G09G 3/003 348/333.06 |
| 2017/0237888 A1 | 8/2017 | Harris et al. |
| 2021/0103314 A1 | 4/2021 | Ko et al. |
| 2022/0139282 A1 | 5/2022 | Kim et al. |
| 2022/0319009 A1* | 10/2022 | Choi ................. H04M 1/72454 |

FOREIGN PATENT DOCUMENTS

| | | |
|---|---|---|
| KR | 10-2014-0025231 A | 3/2014 |
| KR | 10-2014-0051013 A | 4/2014 |
| KR | 10-2015-0009744 A | 1/2015 |
| KR | 10-2016-0148681 A | 12/2016 |
| KR | 10-2017-0062121 A | 6/2017 |
| KR | 10-2289369 B1 | 8/2021 |
| WO | 2021/049675 A1 | 3/2021 |

OTHER PUBLICATIONS

European Search Report dated Nov. 22, 2024, issued in European Application No. 22890194.8.

* cited by examiner

METHOD FOR PROVIDING IMAGE AND ELECTRONIC DEVICE SUPPORTING THE SAME

CROSS-REFERENCE TO RELATED APPLICATION(S)

This application is a continuation application, claiming priority under § 365(c), of an International application No. PCT/KR2022/015299, filed on Oct. 11, 2022, which is based on and claims the benefit of a Korean patent application number 10-2021-0151773, filed on Nov. 5, 2021, in the Korean Intellectual Property Office, the disclosure of which is incorporated by reference herein in its entirety.

TECHNICAL FIELD

The disclosure relates to a method for providing images and an electronic device supporting the same.

BACKGROUND ART

In line with increasing demands for mobile communication and high levels of integration of electronic devices, the portability of electronic devices, such as mobile communication terminals may be improved, and convenience may be improved in connection with using multimedia functions. For example, displays having integrated touchscreen functions may replace traditional mechanical (button-type) keypads such that electronic devices become compact while maintaining input device functions.

It may be more convenient to use electronic devices having larger screen outputs when using web surfing or multimedia functions. Electronic devices may have larger screens to output larger screens but, considering the portability of electronic devices, there may be restrictions on increasing the display size.

There has recently been active development regarding flexible displays. Flexible displays may be mounted on electronic devices so as to be slidable, foldable or bendable, or rollable. Electronic devices including flexible displays may provide expanded or reduced screens, depending on the user demands.

Meanwhile, electronic devices may display images acquired through cameras, based on the horizontal/vertical ratio of images (hereinafter, referred to as "image aspect ratio") configured by inputs (for example, user inputs), through displays. For example, if the image aspect ratio is configured to be 1:1 by a user input, an electronic device may process an image acquired through a camera such that the image aspect ratio becomes 1:1, and may display the processed image through a display.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

When the image aspect ratio if changed by a user input in an electronic device, the electronic device stops image capture through the camera module and changes the configuration of the camera module (for example, image sensor) so as to correspond to the changed image aspect ratio. After changing the camera module configuration, the electronic device resumes the capture through the camera module based on the changed camera module configuration. For example, if the image aspect ratio is changed from 1:1 to 4:3 by a user input in the electronic device, the electronic device may stop the capture through the camera module and may configure an area corresponding to the image aspect ratio of 4:3, among the entire area of the image sensor, as an area for image acquisition. After configuring the image acquisition area in the image sensor, the electronic device may resume capture using the configure image sensor area. In such a case, there may be a problem in that the screen display through the electronic device becomes temporarily discontinuous because the capture is stopped, the camera module configuration is changed, and the capture is then resumed.

In addition, in the case of an electronic device including a display having a fixed size (for example, display providing no expanded or reduced screen), if the image aspect ratio is configured to be a full ratio by an input, an image acquired through a camera is processed such that the horizontal/vertical ratio of the image is identical to the horizontal/vertical ratio of the display (for example, the horizontal/vertical ratio of the display having a fixed size), and the processed image is displayed through the display. For example, in the case of an electronic device including a display having a fixed size, if the image aspect ratio is configured to be a full ratio by an input, the electronic device may acquire information about a predefined display horizontal/vertical ratio. The electronic device may acquire, based on the information about the display horizontal/vertical ratio, an image through an area of an image sensor corresponding to the display horizontal/vertical ratio (for example, an image sensor included in a camera module) (for example, an area configured in the same horizontal/vertical ratio as the display horizontal/vertical ratio among the entire area of the image sensor), and may display the acquired image through the display.

However, unlike an electronic device including a display having a fixed size, an electronic device including a flexible display may have difficulty in predefining information regarding the display horizontal/vertical ratio as a result of expansion or reduction of the flexible display. Accordingly, in the case of an electronic device including a flexible display, if the image aspect ratio is configured to be a full ratio by an input, it may be difficult to process an image acquired through a camera such that the image horizontal/vertical ratio is identical to the horizontal/vertical ratio of the display exposed to the outside.

Aspects of the disclosure are to address at least the above-mentioned problems and/or disadvantages and to provide at least the advantages described below. Accordingly, an aspect of the disclosure is to provide a method for providing images and an electronic device supporting the same, wherein in connection with an electronic device including a flexible display, an image having the same horizontal/vertical ratio as the horizontal/vertical ratio of a display exposed to the outside is acquired, and a function related to the image is performed based on the acquired image.

Technical issues to be addressed by the disclosure are not limited to the above-mentioned technical issues, and other technical issues not mentioned herein will be clearly understood from the following description by those skilled in the art to which the disclosure pertains.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a flexible display in which a region exposed to an outside is reduced as the flexible display is drawn into the electronic device and the region exposed to the outside is expanded as the flexible display is drawn out of the electronic device, a camera module including an image sensor, at least one sensor, and at least one processor electrically connected to the flexible display, the camera module, and the at least one sensor, wherein the at least one processor is configured to acquire an image through the image sensor, identify the region of the flexible display exposed to the outside, through the at least one sensor, determine, within the image, an image part corresponding to the identified region of the flexible display, determine, within the determined image part, a region for performing at least one function related to the image, and perform the at least one function, based on the determined region.

In accordance with another aspect of the disclosure, a method for providing an image by an electronic device is provided. The method includes acquiring an image through an image sensor included in a camera module of the electronic device, identifying, through at least one sensor of the electronic device, a region of a flexible display exposed to an outside in the flexible display of the electronic device, the region exposed to the outside being reduced as the flexible display is drawn into the electronic device, and the region exposed to the outside being expanded as the flexible display is drawn out of the electronic device, determining, within the image, an image part corresponding to the identified region of the flexible display, determining, within the determined image part, a region for performing at least one function related to the image, and performing the at least one function, based on the determined region.

Advantageous Effects

A method for providing images and an electronic device supporting the same, according to various embodiments of the disclosure, are advantageous as follows. In an electronic device including a flexible display, even if the externally exposed area of the flexible display is changed (for example, even during the same is changed) by a movement of the flexible display into or out of the electronic device while a camera module of the electronic device is driven, an image having the same horizontal/vertical ratio as the horizontal/vertical ratio of the externally exposed display is acquired, and a function related to the image is performed based on the acquired image, thereby providing a seamless screen.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
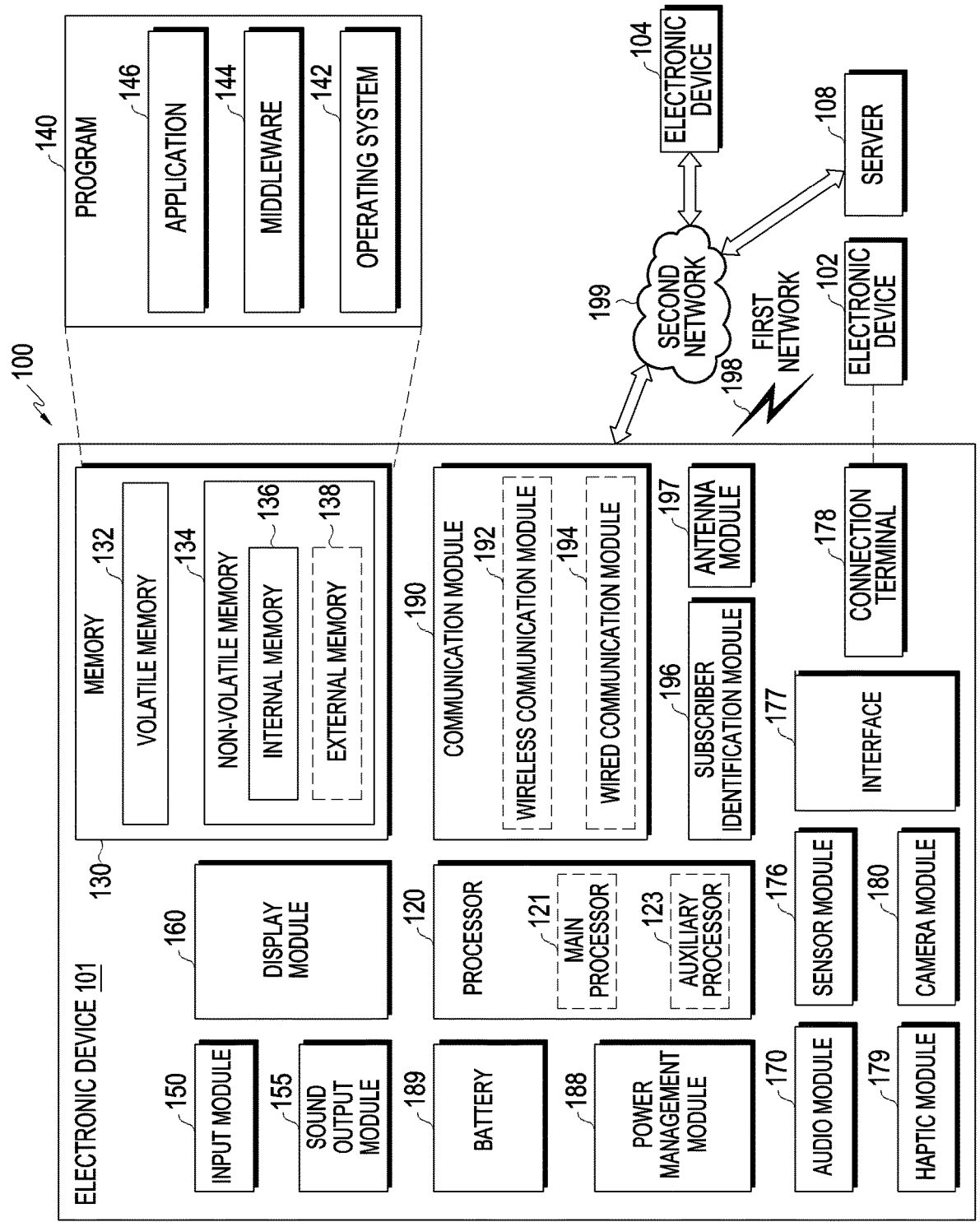
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
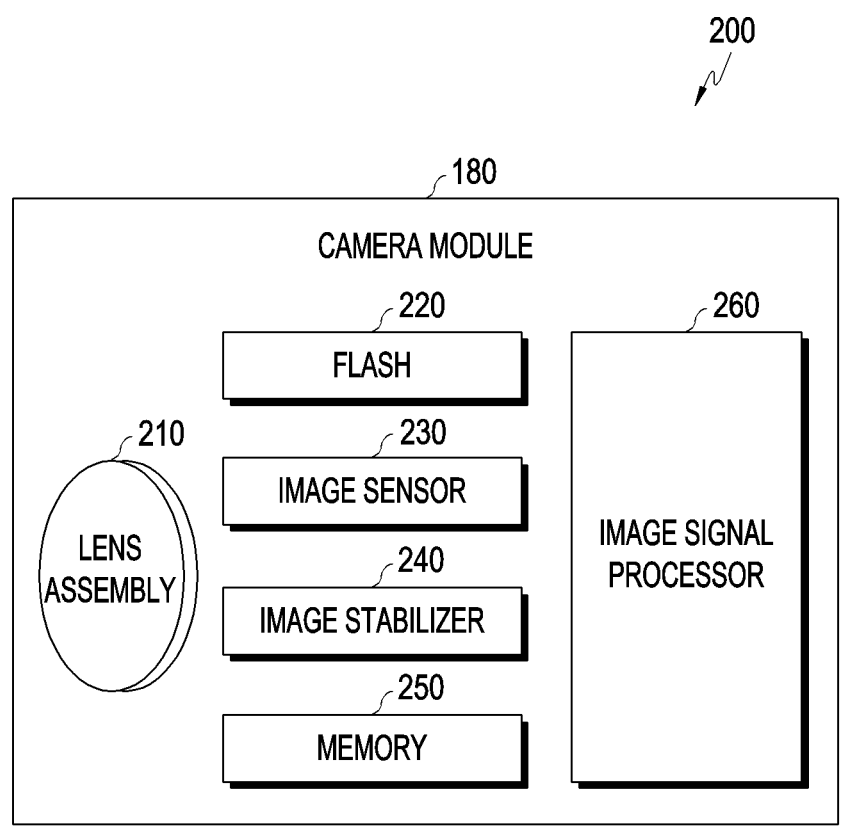
FIG. 2 is a block diagram illustrating a camera module according to an embodiment of the disclosure.

FIG. 2 is a block diagram 200 illustrating a camera module according to an embodiment of the disclosure.

Referring to FIG. 2, the camera module 180 may include a lens assembly 210, a flash 220, an image sensor 230, an image stabilizer 240, a memory 250 (e.g., buffer memory), or an image signal processor 260.

The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal.

According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules may form a rear camera.

Figure 3A:
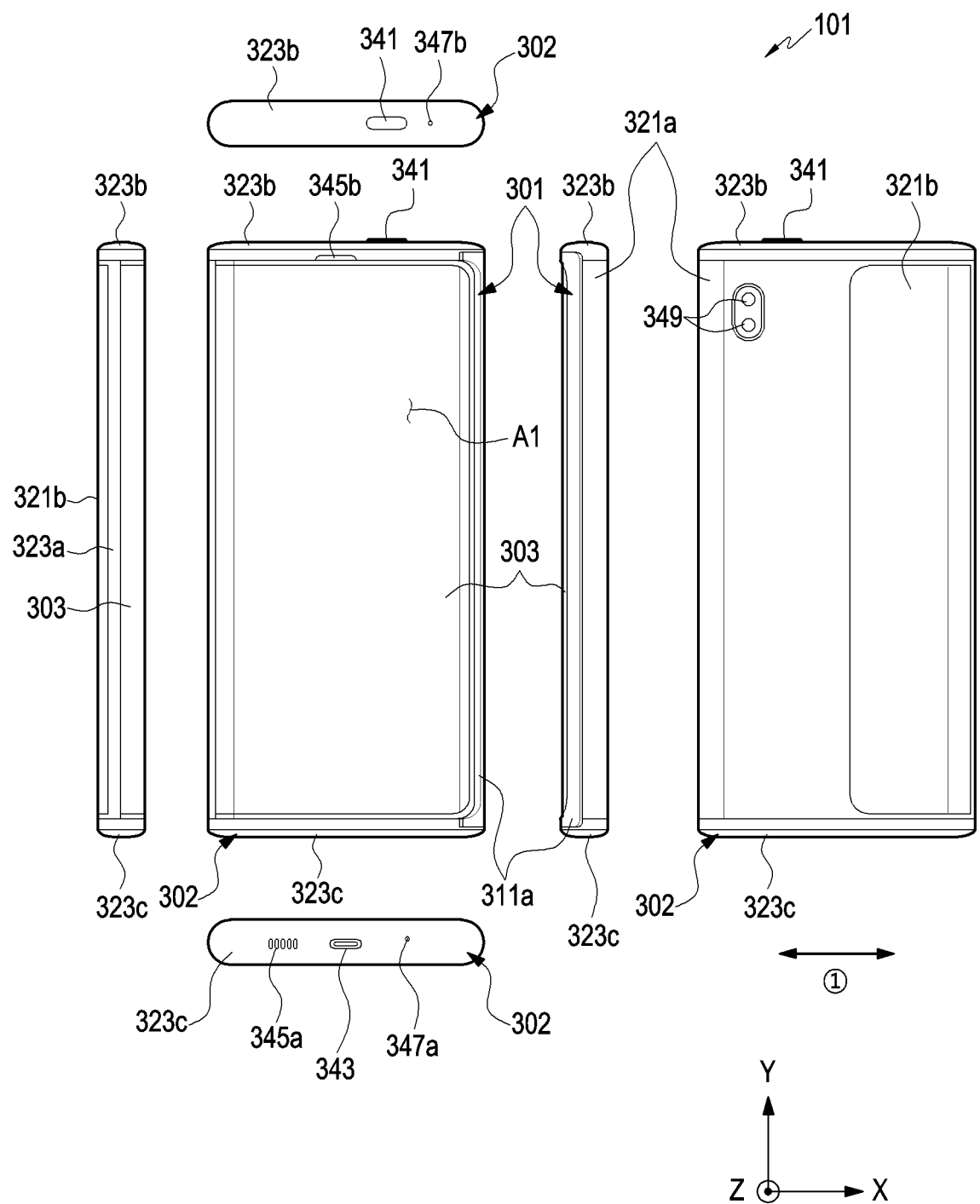
FIGS. 3A and 3B are diagrams illustrating an electronic device including a slidable display according to various embodiments of the disclosure.
Figure 3B:
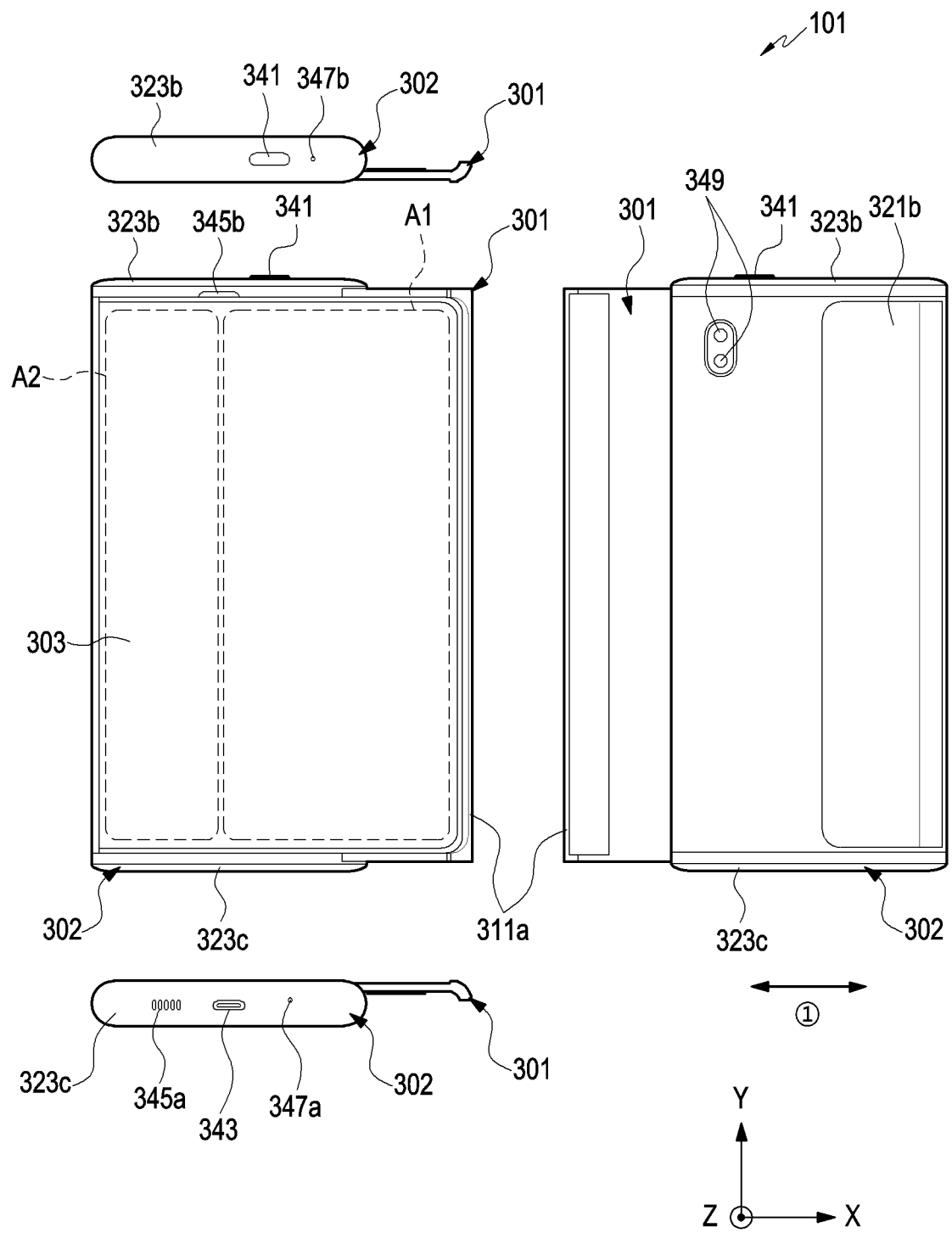

FIGS. 3A and 3B are diagrams illustrating an electronic device including a slidable display according to various embodiments of the disclosure.

In an embodiment of the disclosure, FIG. 3A may be a diagram illustrating a state in which a part (e.g., a second region A2) of a slidable display (e.g., a display 303) is received in a second structure 302. In an embodiment of the disclosure, FIG. 3B may be a diagram illustrating a state in which most of the slidable display (e.g., the display 303) is exposed to the outside of the second structure 302.

The state shown in FIG. 3A may be defined as that a first structure 301 is closed with respect to the second structure 302, and the state shown in FIG. 3B may be defined as that the first structure 301 is opened with respect to the second structure 302. According to an embodiment of the disclosure, a "closed state" or an "opened state" may be defined as a state in which an electronic device is closed or opened.

Referring to FIGS. 3A and 3B, the electronic device 101 may include the first structure 301 and the second structure 302 movably disposed in the first structure 301. In some embodiments of the disclosure, it may be interpreted as a structure in which the first structure 301 is disposed to be slidably movable on the second structure 302 in the electronic device 101. According to an embodiment of the disclosure, the first structure 301 may be disposed to be able to reciprocate by a predetermined distance in a direction shown with reference to the second structure 302, for example, in a direction (e.g., the X-axis direction or the −X-axis direction) indicated by an arrow ①.

According to an embodiment of the disclosure, the first structure 301 may be referred to as, for example, a first housing, a slide portion, or a slide housing, and may be disposed to be able to reciprocate on the second structure 302. In an embodiment of the disclosure, the second structure 302 may be referred to as, for example, a second housing, a main portion, or a main housing, and may receive various electrical and electronic components, such as a main circuit board or a battery. A part (e.g., a first region A1) of the display 303 may be seated on the first structure 301. In some embodiments of the disclosure, another part (e.g., the second region A2) of the display 303 may be received (e.g., a slide-in operation) in the inside of the second structure 302 or exposed (e.g., a slide-out operation) to the outside of the second structure 302, as the first structure 301 moves (e.g., a slide movement) with respect to the second structure 302.

According to various embodiments of the disclosure, the first structure 301 may include a first plate 311a (e.g., a slide plate), and may include a first surface configured to include at least a part of the first plate 311a, and a second surface facing in a direction opposite to a direction in which the first surface faces. According to an embodiment of the disclosure, the second structure 302 may include a second plate 321a (e.g., a rear case), a first sidewall 323a extending from the second plate 321a, a second sidewall 323b extending from the first sidewall 323a and the second plate 321a, and a third sidewall 323c extending from the first sidewall 323a and the second plate 321a and parallel to the second sidewall 323b, and/or a rear plate 321b (e.g., a rear window). In some embodiments of the disclosure, the second sidewall 323b and the third sidewall 323c may be configured to be perpendicular to the first sidewall 323a. According to an embodiment of the disclosure, the second plate 321a, the first sidewall 323a, the second sidewall 323b, and the third sidewall 323c may be configured to have one side (e.g., a front face) open to receive (or surround) at least a part of the first structure 301. For example, the first structure 301 may be coupled to the second structure 302 in a state of being at least partially surrounded, and slidingly move in a direction parallel to the first surface or the second surface, for example, in a direction (e.g., the X-axis direction or the −X-axis direction) indicated by the arrow ① while being guided by the second structure 302.

According to various embodiments of the disclosure, the second sidewall 323b or the third sidewall 323c may be omitted. According to an embodiment of the disclosure, the second plate 321a, the first sidewall 323a, the second sidewall 323b, and/or the third sidewall 323c may be configured as a separate structure, and thus combined or assembled with each other. The rear plate 321b may be coupled to surround at least a part of the second plate 321a. In some embodiments of the disclosure, the rear plate 321b may be configured substantially integrally with the second plate 321a. According to an embodiment of the disclosure, the second plate 321a or the rear plate 321b may cover at least a part of the display 303. For example, the display 303 may be at least partially received in the second structure 302, and the second plate 321a or the rear plate 321b may cover a part of the display 303 received in the second structure 302.

According to various embodiments of the disclosure, the first structure 301 is movable in an opened state and a closed state with respect to the second structure 302 in a first direction (e.g., direction ①) parallel to the second plate 321a (e.g., the rear case) and the second sidewall 323b, and may move such that the first structure 301 is placed at a first distance from the first sidewall 323a in the closed state and is placed at a second distance greater than the first distance from the first sidewall 323a in the opened state. In some embodiments of the disclosure, in a case of a closed state, the first structure 301 may be positioned to surround a part of the first sidewall 323a.

According to various embodiments of the disclosure, the second structure 302 may include at least a part of a non-conductive material (e.g., a polymer material (e.g., plastic), glass, or ceramic). For example, the second structure 302 may be configured by combining a conductive housing and a plate formed of a polymer material.

According to various embodiments of the disclosure, the electronic device 101 may include the display 303, a key input device 341, a connector hole 343, audio modules 345a, 345b, 347a, and 347b, or a camera module 349. Although not shown, the electronic device 101 may further include an indicator (e.g., an LED device) or various sensor modules.

According to various embodiments of the disclosure, the display 303 may include the first region A1 and the second region A2. In an embodiment of the disclosure, the first region A1 may extend substantially across at least a part of the first surface to be disposed on the first surface. The second region A2 may extend from the first region A1 and may be inserted into or received in the second structure 302 (e.g., a housing) according to a sliding movement of the first structure 301, or exposed to the outside of the second structure 302. As will be described later, the second region A2 may move while being substantially guided by a roller (e.g., a roller 830) mounted on the second structure 302, and thus be received in the second structure 302 or exposed to the outside of the second structure 302. For example, while the first structure 301 slidingly moves, a part of the second region A2 may be deformed into a curved shape at a position corresponding to the roller (e.g., the roller 830).

According to various embodiments of the disclosure, when viewed from the top of the first plate 311a (e.g., the slide plate), when the first structure 301 moves from a closed state to an opened state, the second region A2 may be gradually exposed to the outside of the second structure 302 to substantially form a flat surface together with the first display region A1. The display 303 may be coupled to or disposed adjacent to a touch detection circuit, a pressure sensor capable of measuring the intensity (pressure) of a touch, and/or a digitizer which detects a magnetic field-type stylus pen. In an embodiment of the disclosure, the second region A2 may be at least partially received in the second structure 302, and a part of the second region A2 may be visually exposed to the outside even in the state (e.g., a closed state) shown in FIG. 3A. In some embodiments of the disclosure, irrespective of a closed state or an opened state, a part of the second region A2 exposed may be located on the roller (e.g., the roller 830), and a part of the second region A2 may maintain a curved shape at a position corresponding to the roller.

The key input device 341 may be disposed on the second sidewall 323b or the third sidewall 323c of the second structure 302. According to an external appearance and a use state, the electronic device 101 may be designed such that the shown key input device 341 is omitted or additional key input device(s) are included. In some embodiments of the disclosure, the electronic device 101 may include a key input device which is not shown, for example, a home key button, or a touch pad disposed around the home key button. According to another embodiment of the disclosure, at least a part of the key input device 341 may be located in one region of the first structure 301.

According to various embodiments of the disclosure, the connector hole 343 may be omitted according to an embodiment of the disclosure, and may receive a connector (e.g., a USB connector) for transmitting or receiving power and/or data to or from an external electronic device. Although not shown, the electronic device 101 may include a plurality of connector holes 343, and a part of the plurality of connector holes 343 may function as a connector hole for transmitting or receiving an audio signal to or from an external electronic device. In the illustrated embodiment of the disclosure, the connector hole 343 is disposed on the third sidewall 323c, but the disclosure is not limited thereto, the connector hole 343 or a connector hole not shown may be disposed on the first sidewall 323a or the second sidewall 323b.

According to various embodiments of the disclosure, the audio modules 345a, 345b, 347a, and 347b may include speaker holes 345a and 345b or microphone holes 347a and 347b. One of the speaker holes 345a and 345b may be provided as a receiver hole for a voice call, and the other may be provided as an external speaker hole. The microphone holes 347a and 347b may include a microphone disposed therein so as to acquire external sound, and in some embodiments of the disclosure, multiple microphones may be disposed therein so as to detect the direction of sound. In some embodiments of the disclosure, the speaker holes 345a and 345b and the microphone holes 347a and 347b may be implemented as a single hole, or a speaker may be included without the speaker holes 345a and 345b (e.g., a piezo speaker). According to an embodiment of the disclosure, the speaker hole indicated by the reference numeral "345b" may be disposed on the first structure 301 and used as a receiver hole for a voice call, and the speaker hole (e.g., an external speaker hole) indicated by the reference numeral "345a", or the microphone holes 347a and 347b may be disposed on the second structure 302 (e.g., one of side surfaces 323a, 323b, and 323c).

The camera module 349 may be provided in the second structure 302 and may photograph a subject in a direction opposite to the first region A1 of the display 303. The electronic device 101 may include a plurality of camera modules 349. For example, the electronic device 101 may include a wide-angle camera, a telephoto camera, or a close-up camera, and include an infrared projector and/or an infrared receiver, according to an embodiment of the disclosure, so as to measure a distance to a subject. The camera module 349 may include one or more lenses, an image sensor, and/or an image signal processor. Although not shown, the electronic device 101 may further include a camera module (e.g., a front camera) for photographing a subject in a direction opposite to the first region A1 of the display 303. For example, the front camera may be disposed around the first region A1 or disposed in a region overlapping with the display 303, and when the front camera is disposed in the region overlapping with the display 303, the front camera may photograph a subject through the display 303.

According to various embodiments of the disclosure, an indicator (not shown) of the electronic device 101 may be disposed in the first structure 301 or the second structure 302, and may include a light-emitting diode so as to provide state information of the electronic device 101 via a visual signal. A sensor module (not shown) of the electronic device 101 may generate an electrical signal or data value corresponding to an external environment state or an internal operating state of the electronic device 101. The sensor module may include, for example, a proximity sensor, a fingerprint sensor, or a biometric sensor (e.g., an iris/face recognition sensor or an HRM sensor). In another embodiment of the disclosure, the electronic device may further include a sensor module, for example, at least one of a gesture sensor, a gyro sensor, an air pressure sensor, a magnetic sensor, an acceleration sensor, a grip sensor, a color sensor, an infrared (IR) sensor, a temperature sensor, a humidity sensor, or an illuminance sensor.

Figure 4A:
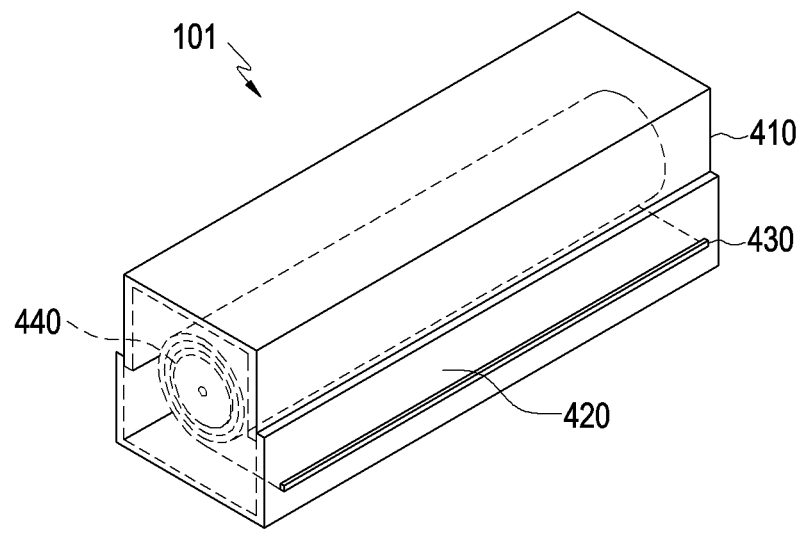
FIGS. 4A and 4B are diagrams illustrating an electronic device including a rollable display according to various embodiments of the disclosure.
Figure 4B:
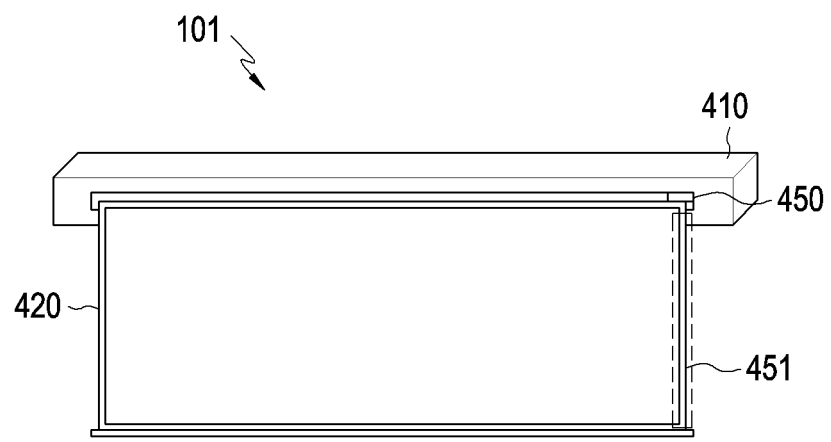

FIGS. 4A and 4B are diagrams illustrating an electronic device including a rollable display according to various embodiments of the disclosure.

Referring to FIGS. 4A and 4B, in an embodiment of the disclosure, the electronic device 101 may include a rollable display (e.g., a display 420) as a flexible display.

In an embodiment of the disclosure, the electronic device 101 may include a housing 410, a display 420, an opening portion 430 through which the display 420 can be drawn in/out, a roller 440 on which the display 420 can be wound, and a sensor 450.

In an embodiment of the disclosure, the display 420 may be drawn in/out through the opening portion 430 according to rotation of the roller 440. When the display 420 is drawn in through the opening portion 430, a display region of the display 420 may be reduced, and when the display 420 is drawn out through the opening portion 430, a display region of the display 420 may increase.

In an embodiment of the disclosure, the rotation of the roller 440 may be performed by a user interaction in which a user pulls or pushes the display 420 (or a member (not shown) for pulling or pushing the display 420). However, the disclosure is not limited thereto, and the roller 440 may be rotated by a driving module which drives the roller 440 according to control of the processor 120.

In FIGS. 4A and 4B, the electronic device 101 implemented in a form in which the rollable display 420 is drawn out from the housing 410 (and drawn into the housing 410 in a second direction opposite to a first direction) in the first direction by one roller 440 included in the housing 410 is exemplified, but the disclosure is not limited thereto. For example, the electronic device 101 may be implemented in a form in which the rollable display is drawn out in different directions (e.g., in opposite directions) from the housing included in the electronic device by two or more rollers.

Although not shown in FIGS. 4A and 4B, in an embodiment of the disclosure, the electronic device 101 may include a configuration capable of fixing a rolled state of the display 420 and an unfolded state of the display 420.

In an embodiment of the disclosure, when the display 420 is drawn out from the housing 410 or drawn into the housing 410, according to rotation of the roller 440, the sensor 450 may detect a region of the display 420 exposed to the outside. For example, the sensor 450 may detect a pattern 451 printed on the display 420. A pattern 131 may be a QR code, a barcode, a black-and-white pattern, or a color pattern corresponding to a pixel line of the display 420. As the display 420 is drawn out, a value of the pattern 131 printed on the display 420 may be changed, and the processor 120 may detect a region of the display 420 exposed to the outside according to the changed value of the pattern 131. For another example, in place of the sensor 450 or in addition to the sensor 450, the electronic device may detect a region of the display 420 exposed to the outside, through a motion sensor (e.g., an acceleration sensor and/or a gyro sensor) and/or a rotation detection sensor which detects rotation of the roller 440. However, a method for detecting a region of the display 420 exposed to the outside is not limited to the above-described examples, and more various examples for detecting a region of the display 420 exposed will be described late.

Figure 5:
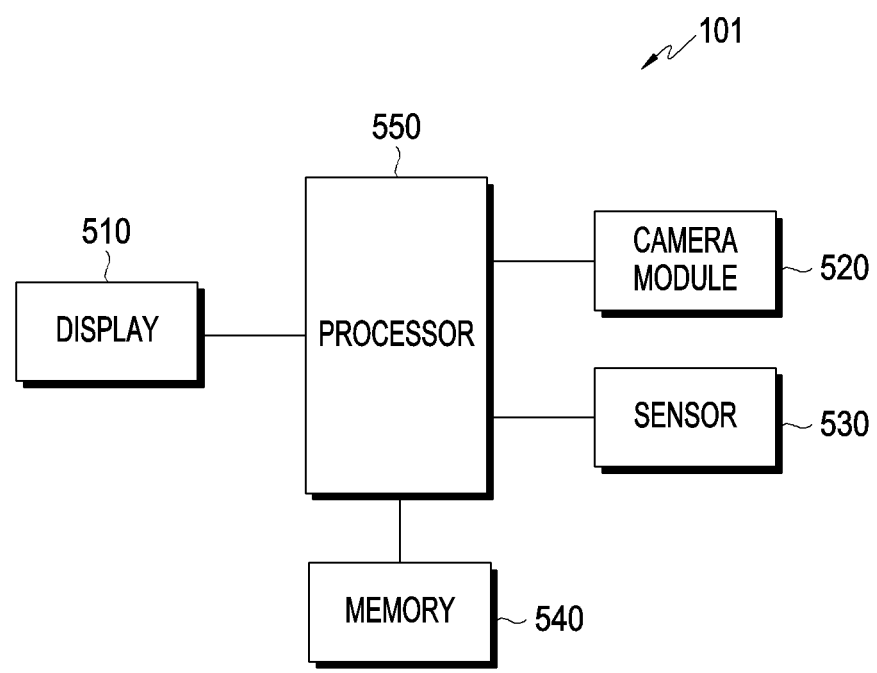
FIG. 5 is a block diagram of an electronic device according to an embodiment of the disclosure.

FIG. 5 is a block diagram of an electronic device according to an embodiment of the disclosure.

Referring to FIG. 5, in an embodiment of the disclosure, the electronic device 101 may include a display 510, a camera module 520, a sensor 530, a memory 540, and/or a processor 550.

In an embodiment of the disclosure, although not shown in FIG. 5, when the display 510 includes a slidable display (e.g., the display 303), the electronic device 101 may further include the first structure 301 and the second structure 302 for expanding or reducing a region of the display exposed to the outside. In an embodiment of the disclosure, when display 510 includes a rollable display (e.g., the display 420), the electronic device 101 may further include the housing 410 for expanding or reducing a region of the display exposed to the outside.

In an embodiment of the disclosure, the display 510 may be included in the display module 160 of FIG. 1.

In an embodiment of the disclosure, the display 510 may be a flexible display. For example, the display 510 may be a slidable display as shown in FIGS. 3A and 3B. For another example, the display 510 may be a rollable display as shown in FIGS. 4A and 4B. However, the disclosure is not limited thereto, and the display 510 may include all displays in which the size of a region exposed to the outside of the electronic device 101 can be changed. Hereinafter, a region of the display 510 exposed to the outside as the display 510 is drawn into the electronic device 101 or drawn out of the electronic device 101 will be referred to as a "display region of the display".

In an embodiment of the disclosure, the display 510 may be manually or automatically drawn into the electronic device 101 or drawn out of the electronic device 101. For example, the display 510 may be drawn into the electronic device 101 (e.g., the second structure 302 or the housing 410) or drawn out from the electronic device 101 by a user input (e.g., a user's force of pulling or pushing the first structure 301 or the display 420) (e.g., manually) to the first structure 301 or the display 510 (e.g., the display 420). For another example, the display 510 may be drawn into the electronic device 101 (e.g., the second structure 302 or the housing 410) or drawn out from the electronic device 101, based on an input (e.g., an icon) to a screen displayed through the display 510 or a physical key input (e.g., automatically).

In an embodiment of the disclosure, the camera module 520 may be included in the camera module 180 of FIGS. 1 and 2.

In an embodiment of the disclosure, the camera module 520 may acquire an image while a display region of the display is expanded or reduced (or in a state in which at least partial region of the display 510 is exposed to the outside). For example, the camera module 520 may continuously (or in real time) acquire multiple images while the display region of the display is expanded or reduced.

In an embodiment of the disclosure, the sensor 530 may be configured to identify (e.g., obtain) a display region of the display.

In an embodiment of the disclosure, the sensor 530 may include a hall sensor for identifying a display region of the display. For example, when the display 510 is a slidable display as shown in FIGS. 3A and 3B, a plurality of hall sensors may be disposed on the second structure 302, and a magnet may be disposed on the first structure 301. As the first structure 301 slidingly moves, a position of the magnet disposed on the first structure 301 may be changed. The plurality of hall sensors disposed on the second structure 302 may detect a magnetic field formed by the magnet and changed according to the position of the magnet. The plurality of hall sensors disposed on the second structure 302 detect a magnetic field formed by the magnet, so that the display region of the display may be identified.

In an embodiment of the disclosure, the sensor 530 may include an optical sensor for identifying a display region of the display. For example, when the display 510 is a slidable display as shown in FIGS. 3A and 3B, an optical pattern may be disposed on the second structure 302, and an optical sensor (e.g., a photo detector) may be disposed on the first structure 301. As the first structure 301 slidingly moves, a position of the optical sensor disposed on the first structure 301 may be moved. The photo detector detects the optical pattern disposed on the second structure 302, so that the display region of the display may be identified.

In an embodiment of the disclosure, the sensor 530 may include an inertial sensor (also referred to as a "motion sensor") for identifying a display region of the display. For example, when the display 510 is a slidable display as shown in FIGS. 3A and 3B, acceleration sensors (e.g., 6-axis acceleration sensors) may be disposed in each of the first structure 301 and the second structure 302. The acceleration sensors acquire information on a relative position (or a change of a position) of the first structure 301 with respect to the second structure 302, so that the display region of the display may be identified.

In an embodiment of the disclosure, the sensor 530 may include a pressure sensor for identifying a display region of the display. For example, when the display 510 is a slidable display as shown in FIGS. 3A and 3B, the pressure sensor may be included in the display 510. As the first structure 301 slidingly moves with respect to the second structure 302, a pressure detected in a part forming a curved surface within the display 510 and a pressure detected in a flat part within the display 510 may be different from each other. Based on information on a pressure detected by the pressure sensor, the display region of the display may be identified.

In an embodiment of the disclosure, the sensor 530 may include an illuminance sensor for identifying a display region of the display. For example, when the display 510 is a slidable display as shown in FIGS. 3A and 3B, each of a plurality of parts of the display 510 may transmit a different amount of external light (e.g., each of the plurality of parts of the display 510 may be implemented to have a different blocking rate for external light). At least one illuminance sensor disposed on the second structure 302 detects an amount of external light (or a change in an amount of external light) detected by the illuminance sensor as the first structure 301 slidingly moves, so that the display region of the display may be identified.

In an embodiment of the disclosure, the sensor 530 may include a rotation angle sensor for identifying a display region of the display. For example, when the display 510 is a slidable display as shown in FIGS. 3A and 3B, at least one rotation angle sensor disposed on the roller (e.g., the roller 830 of FIG. 8) detects an amount of rotation angle (or a change in rotation angle) at which the roller rotates as the first structure 301 slidingly moves, so that the display region of the display may be identified.

In an embodiment of the disclosure, although not shown in FIG. 5, the electronic device 101 may include devices for identifying a display region of the display in addition to the sensor 530. For example, when the display 510 is a slidable display as shown in FIGS. 3A and 3B, the first structure 301 may include a mechanical switch element, and the second structure 302 may include a recess or a protrusion which may engage or interfere with the mechanical switch element. While the first structure 301 slidingly moves with respect to the second structure 302, a position of the recess or protrusion which engages or interferes with the mechanical switch element included in the first structure 301 is identified, so that the display region of the display may be identified.

In the above-described examples, when the display 510 is a slidable display as shown in FIGS. 3A and 3B, a method for identifying a display region of the display by the sensor 530 has been described, but the disclosure is not limited thereto. Even when the display 510 is a rollable display as shown in FIGS. 4A and 4B, the sensor 530 may identify a display region of the display in the same or similar manner to the above-described examples.

In an embodiment of the disclosure, the memory 540 may be included in the memory 130 of FIG. 1.

In an embodiment of the disclosure, the memory 540 may store information for performing at least a part of an operation of providing an image. The information stored by the memory 540 will be described later.

In an embodiment of the disclosure, the processor 550 may be included in the processor 120 of FIG. 1.

In an embodiment of the disclosure, the processor 550 may overall control the operation of providing an image. In an embodiment of the disclosure, processor 550 may include one or more processors for performing the operation of providing an image. An operation performed by the processor 550 to provide an image will be described with reference to FIG. 6 or below.

In an embodiment of the disclosure, in FIG. 5, the electronic device 101 is exemplified as including the display 510, the camera module 520, the sensor 530, the memory 540, and/or the processor 550, but the disclosure is not limited thereto. For example, the electronic device 101 may further include at least one component (e.g., the communication module 190) among configurations of the electronic device 101 shown in FIG. 1.

An electronic device according to various embodiments of the disclosure may include a flexible display in which a region exposed to an outside is reduced as the flexible display is drawn into the electronic device and the region exposed to the outside is expanded as the flexible display is drawn out of the electronic device, a camera module including an image sensor, at least one sensor, and at least one processor electrically connected to the flexible display, the camera module, and the at least one sensor, wherein the at least one processor is configured to acquire an image through the image sensor, identify a region of the flexible display exposed to the outside, through the at least one sensor, determine, within the image, an image part corresponding to the identified region of the flexible display, determine, within the determined image part, a region for performing at least one function related to the image, and perform the at least one function, based on the determined region.

In various embodiments of the disclosure, the at least the processor may be configured to acquire the image through an entire region of the image sensor, based on a user input for setting an image aspect ratio to a full ratio.

In various embodiments of the disclosure, the at least one processor may be configured to identify a horizontal/vertical ratio of the region of the flexible display exposed to the outside, and determine, within the image, as the image part, a region having a horizontal/vertical ratio equal to the horizontal/vertical ratio of the region of the flexible display, with reference to the center of the image.

In various embodiments of the disclosure, the at least one function related to the image may include at least one of an auto focus (AF) function, an auto exposure (AE) function, an auto white balance (AWB) function, a face detection (FD) function, or an object tracking (OT) function.

In various embodiments of the disclosure, the at least one processor may be configured to, when the function related to the image includes the AF function, determine, within the determined image part, a region specified by a user input, a region in which a face is detected, or a screen center region as a region of interest for the AF function.

In various embodiments of the disclosure, the at least one processor may be configured to determine the region of interest for the AF function, based on a priority between the region specified by the user input, the region in which the face is detected, and the screen center region.

In various embodiments of the disclosure, the at least one processor may be configured to, when the function related to the image includes the AE function and/or the AWB function, determine a region substantially equal to the determined image part as a region of interest for the AE function and/or AWB function.

In various embodiments of the disclosure, the at least one processor may be configured to determine whether the region of the flexible display is changed by a threshold region or more, and determine the region for performing the at least one function related to the image within the determined image part, based on determining that the region of the flexible display has been changed by the threshold region or more.

In various embodiments of the disclosure, the at least one processor may be further configured to perform the at least one function, so as to set a setting related to the camera module or correct the image.

In various embodiments of the disclosure, the at least one processor may be further configured to display the image through the flexible display such that the determined image part and a region other than the determined image part within the image are distinguished from each other.

Figure 6:
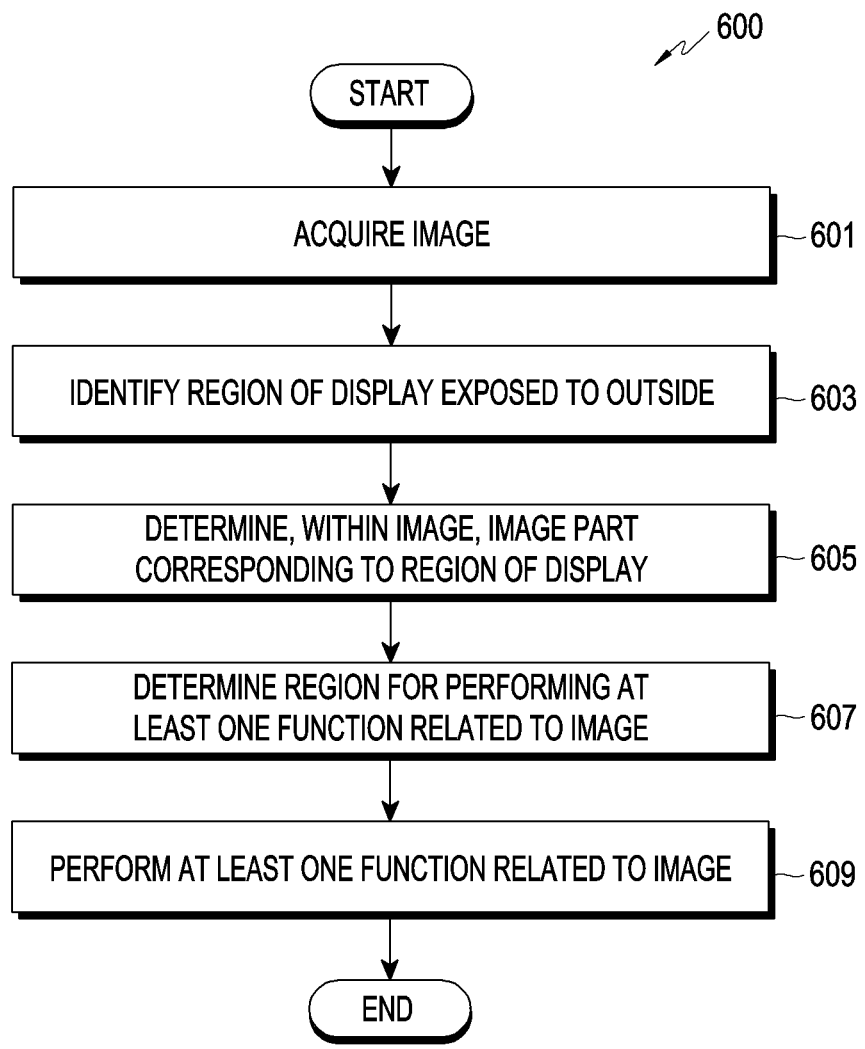
FIG. 6 is a flowchart illustrating a method for providing an image according to an embodiment of the disclosure.

FIG. 6 is a flowchart 600 illustrating a method for providing an image according to an embodiment of the disclosure.

Referring to FIG. 6, in operation 601, in an embodiment of the disclosure, a processor may acquire an image through an image sensor of a camera module.

In an embodiment of the disclosure, the processor 550 may acquire an image through an entire region of an image sensor (e.g., the image sensor 230), based on a user input for setting an image aspect ratio (e.g., a horizontal/vertical ratio of an image to be displayed through a display) to a full ratio.

In an embodiment of the disclosure, the entire region of the image sensor may refer to all pixels configuring the image sensor or remaining pixels other than some pixels not used for image acquisition among the all pixels configuring the image sensor.

In an embodiment of the disclosure, the user input for setting the image aspect ratio to the full ratio may be a user input for displaying an image acquired through the camera module 520 at a horizontal/vertical ratio equal to a horizontal/vertical ratio of a display region (e.g., a region currently exposed to the outside within the display 510) of the display.

In an embodiment of the disclosure, the user input for setting the image aspect ratio to the full ratio may be a user input for displaying an image acquired through the camera module 520, through the entire display region of the display, at a horizontal/vertical ratio equal to the horizontal/vertical ratio of the display region of the display (e.g., in a size substantially equal to a size of the display region of the display).

Figure 7:
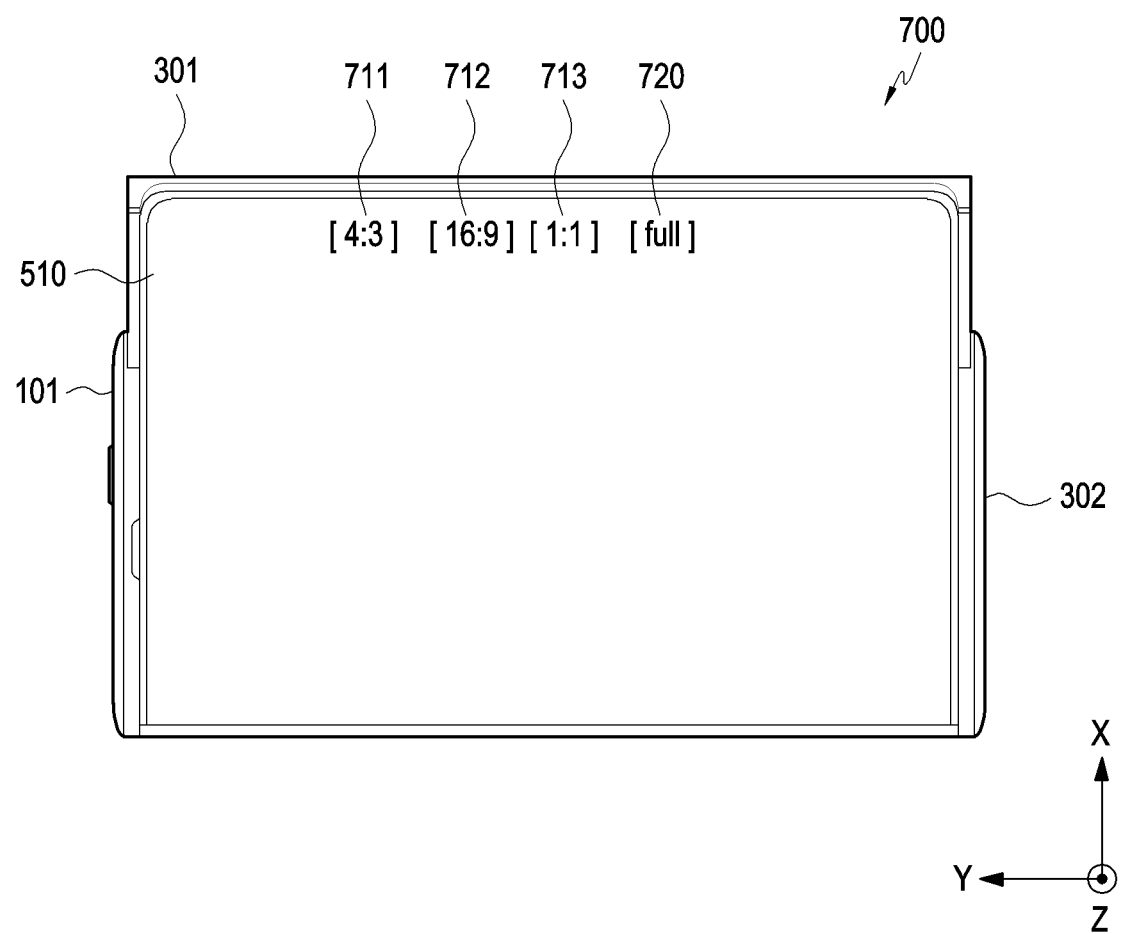
FIG. 7 is a diagram illustrating a method for configuring an image aspect ratio to a full ratio according to an embodiment of the disclosure.

FIG. 7 is a diagram 700 illustrating a method for setting an image aspect ratio to a full ratio according to an embodiment of the disclosure.

Referring to FIG. 7, in an embodiment of the disclosure, the processor 550 may display information for setting an image aspect ratio, through the display 510, while a camera application is being executed. For example, as shown in FIG. 7, the processor 550 may display, through the display 510, objects 711, 712, and 713 for setting a plurality of specified image aspect ratios as image aspect ratios, and an object 720 for setting a full ratio as an image aspect ratio.

In an embodiment of the disclosure, the plurality of specified image aspect ratios may refer to image aspect ratios (e.g., image aspect ratios of 4:3, 16:9, and 1:1) configured to display an image at a fixed ratio, regardless of a change in a display region of the display 510.

In an embodiment of the disclosure, although an object for setting a full ratio as an image aspect ratio in FIG. 7 is exemplified as being displayed as text, such as "full", the disclosure is not limited thereto. For example, the processor 550 may display, through the display 510, text representing a horizontal/vertical ratio of a display region (a region of the display currently exposed to the outside) of the display, as the object for setting the full ratio as the image aspect ratio.

In an embodiment of the disclosure, the processor 550 may set the image aspect ratio to the full ratio, based on a user input to the object 720 for setting the full ratio as the image aspect ratio.

Referring to FIG. 6, in operation 603, in an embodiment of the disclosure, the processor 550 may identify a region (a display region of the display) of the display 510 exposed to the outside of the electronic device 101, through the sensor 530. A method for identifying a display region of the display by the processor 550 through the sensor 530 will be described with reference to FIG. 8 below.

Figure 8:
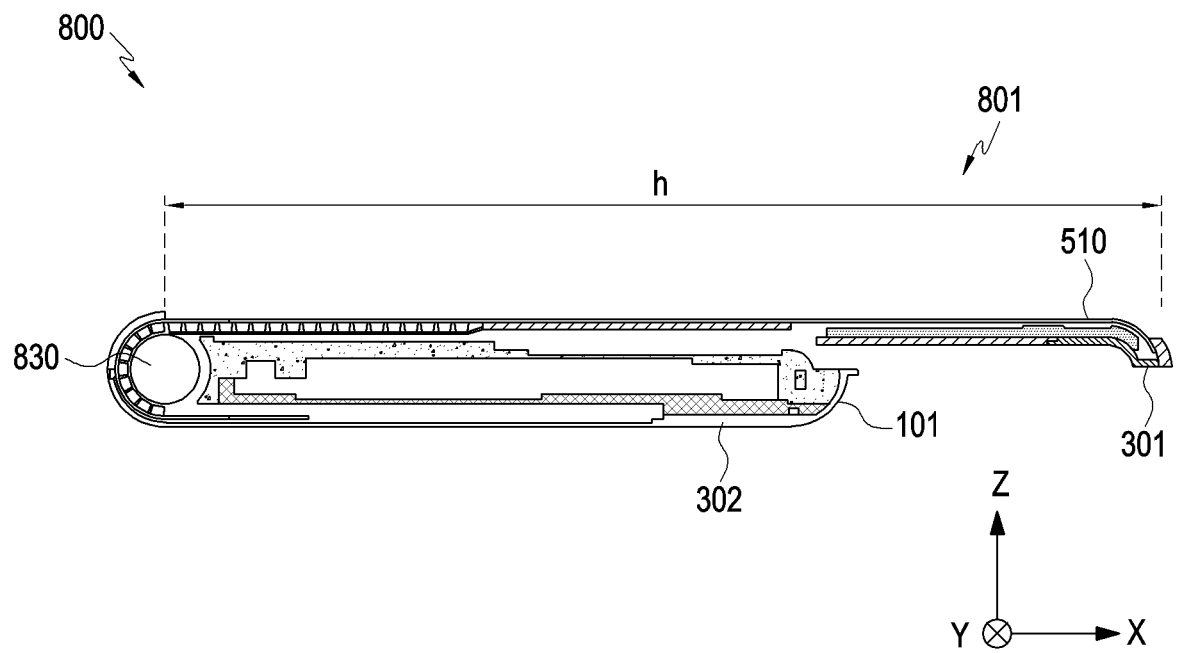
FIG. 8 is a diagram illustrating a method for identifying a region of a display exposed to the outside according to an embodiment of the disclosure.
Figure 8:
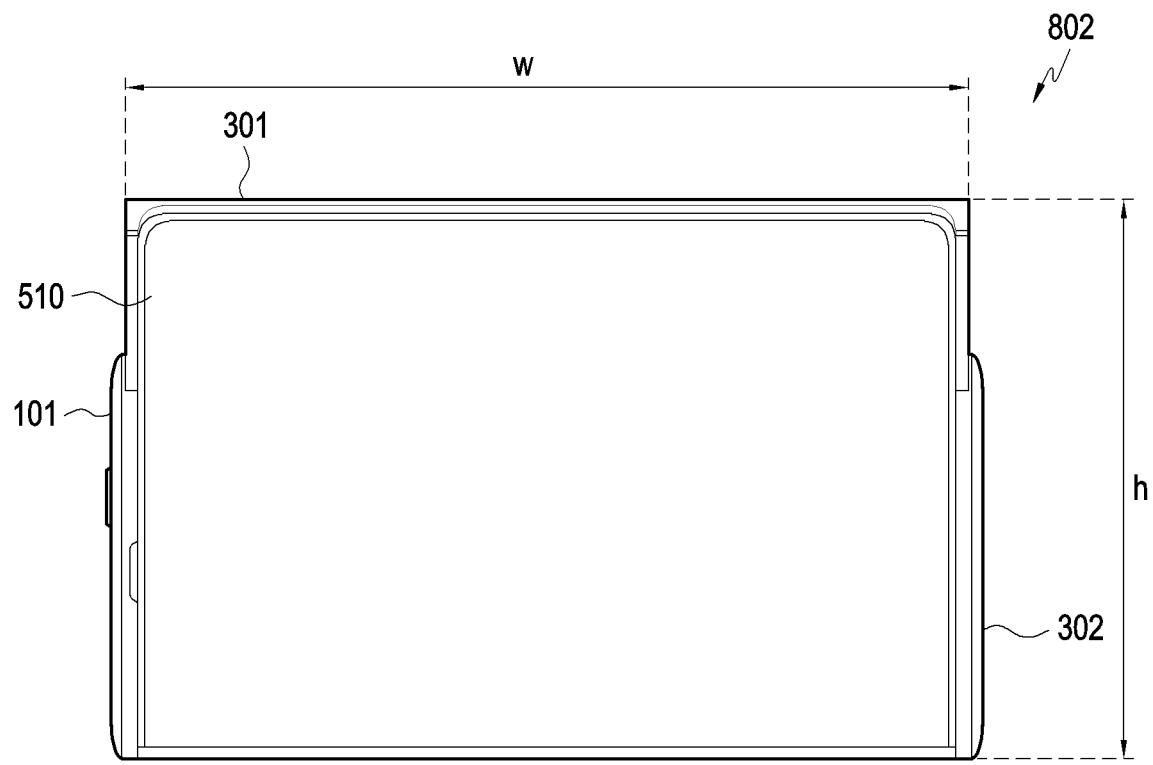

FIG. 8 is a diagram 800 illustrating a method for identifying a region of a display exposed to the outside according to an embodiment of the disclosure.

Referring to FIG. 8, in an embodiment of the disclosure, reference numeral 801 may denote the electronic device 101 including a slidable display in which at least a part of the display 510 is in a state of being exposed to the outside (in an opened state). In an embodiment of the disclosure, the processor 550 may identify a vertical length h of a display region of the display 510 which is changed as the first structure 301 slidingly moves on the second structure 302.

In an embodiment of the disclosure, the processor 550 may identify a vertical length h of a display region of the display which is changed as the first structure 301 slidingly moves on the second structure 302, through a hall sensor. For example, a plurality of hall sensors may be disposed on the second structure 302, and a magnet may be disposed on the first structure 301. As the first structure 301 slidingly moves, a position of the magnet disposed on the first structure 301 may be changed. The plurality of hall sensors disposed on the second structure 302 may detect a magnetic field formed by the magnet and changed according to the position of the magnet. The plurality of hall sensors disposed on the second structure 302 detect a magnetic field formed by the magnet, so that the processor 550 may identify the vertical length h of the display region of the display 510.

In an embodiment of the disclosure, the processor 550 may identify a vertical length h of a display region of the display 510 which is changed as the first structure 301 slidingly moves on the second structure 302, through an optical sensor. For example, an optical pattern may be disposed on the second structure 302 and an optical sensor (e.g., a photo detector) may be disposed on the first structure 301. As the first structure 301 slidingly moves, a position of the optical sensor disposed on the first structure 301 may be moved. The photo detector detects the optical pattern disposed on the second structure 302, so that the processor 550 may identify the vertical length h of the display region of the display 510.

In an embodiment of the disclosure, the processor 550 may identify a vertical length h of a display region of the display 510 which is changed as the first structure 301 slidingly moves on the second structure 302, through an inertial sensor. For example, acceleration sensors (e.g., 6-axis acceleration sensors) may be disposed in each of the first structure 301 and the second structure 302. The acceleration sensors acquire information on a relative position (or a change of a position) of the first structure 301 with respect to the second structure 302, so that the processor 550 may identify the vertical length h of the display region of the display 510.

In an embodiment of the disclosure, the processor 550 may identify a vertical length h of a display region of the display 510 which is changed as the first structure 301 slidingly moves on the second structure 302, through a pressure sensor. For example, the pressure sensor may be included in the display 510. As the first structure 301 slidingly moves with respect to the second structure 302, a pressure detected in a part forming a curved surface within the display 510 and a pressure detected in a flat part within the display 510 may be different from each other. Based on information on a pressure detected by the pressure sensor, the processor 550 may identify the vertical length h of the display region of the display 510.

In an embodiment of the disclosure, the processor 550 may identify a vertical length h of a display region of the display 510 which is changed as the first structure 301 slidingly moves on the second structure 302, through an illuminance sensor. For example, each of a plurality of parts of the display 510 may transmit a different amount of external light (e.g., each of the plurality of parts of the display 510 may be implemented to have a different blocking rate for external light). At least one illuminance sensor disposed on the second structure 302 detects an amount of external light (or a change in an amount of external light) detected by the illuminance sensor as the first structure 301 slidingly moves, so that the processor 550 may identify the vertical length h of the display region of the display 510.

In an embodiment of the disclosure, the processor 550 may identify a vertical length h of a display region of the display 510 which is changed as the first structure 301 slidingly moves on the second structure 302, through a rotation angle sensor. For example, at least one rotation angle sensor disposed on a roller 830 may detect an amount of rotation angle (or a change in rotation angle) at which the roller 830 rotates as the first structure 301 slidingly moves. Based on information on the amount of the rotation angle, the processor 550 may identify the vertical length h of the display region of the display 510.

In an embodiment of the disclosure, although not shown in FIG. 8, the electronic device 101 may include devices for identifying a display region of the display in addition to the sensor 530. For example, the first structure 301 may include a mechanical switch element, and the second structure 302 may include a recess or a protrusion which may engage or interfere with the mechanical switch element. While the first structure 301 slidingly moves with respect to the second structure 302, a position of the recess or protrusion which engages or interferes with the mechanical switch element included in the first structure 301 is identified, so that the processor 550 may identify a vertical length h of a display region of the display 510.

In an embodiment of the disclosure, the processor 550 may identify a display region of the display 510, based on a vertical length h of the display region of the display 510 and a horizontal length w of the display region of the display. For example, at reference numeral 802, the processor 550 identifies a vertical length h of a display region of the display 510 and a horizontal length w of the display region of the display, so that the display region of the display 510 (e.g., a horizontal/vertical ratio of the display region of the display and/or a size of the display region of the display) may be identified (e.g., obtained).

In FIG. 8, although a method for identifying a display region of the display when the display 510 is a slidable display has been described, even when the display 510 is a rollable display, the processor 550 may identify a display region of the display 510 by using the same or similar manner to the examples described with reference to FIG. 8.

Referring to FIG. 6, in operation 605, in an embodiment of the disclosure, the processor 550 may determine an image part (hereinafter, used interchangeably with a "first image part") corresponding to the identified region (a display region of the display) of the display 510 within an image.

In an embodiment of the disclosure, the processor 550 may determine a first image part corresponding to a display region of the display, within an image (hereinafter, used interchangeably with an "entire image region") acquired through the entire region of the image sensor. For example, the processor 550 (e.g., an application processor or the image signal processor 260) may determine, in the entire image region, as the first image part corresponding to the display region of the display, a region having a horizontal/vertical ratio equal to a horizontal/vertical ratio of the display region of the display, with reference to the center of the entire image region. For another example, the processor 550 may determine, as the first image part corresponding to the display region of the display, a region which includes a boundary line in a direction opposite to a direction in which the display region of the display is expanded with reference to the center of the entire image region (a boundary line in a direction in which the display region of the display is reduced) among boundary lines of the entire image region in the entire image region, and has a horizontal/vertical ratio equal to the horizontal/vertical ratio of the display region of the display. For another example, the processor 550 may determine, as the first image part corresponding to the display region of the display, a region which includes a boundary line in the same direction as a direction in which the display region of the display is expanded with reference to the center of the entire image region (or a boundary line in the opposite direction to a direction in which the display region of the display is reduced) among boundary lines of the entire image region in the entire image region, and has a horizontal/vertical ratio equal to the horizontal/vertical ratio of the display region of the display. However, a method for determining a first image part corresponding to a display region of the display is not limited to the above-described examples.

In an embodiment of the disclosure, the processor 550 may determine, based on a zoom ratio associated with a camera, a first image part corresponding to the identified region of the display 510 (a display region of the display) within the image. For example, the processor 550 may determine the first image part corresponding to the display region of the display, in the entire image region, based on a horizontal/vertical ratio of the display region of the display and a currently set zoom ratio of the camera.

Referring to FIG. 6, in operation 607, in an embodiment of the disclosure, the processor 550 may determine a region (hereinafter, referred to as a "region of interest") for performing at least one function related to an image, within the first image part corresponding to the display region of the display.

In an embodiment of the disclosure, the at least one function related to the image may include at least one of an auto focus (AF) function, an auto exposure (AE) function, an auto white balance (AWB) function, a face detection (FD) function, or an object tracking (OT) function.

Referring to FIG. 6, in operation 609, in an embodiment of the disclosure, the processor 550 may perform the at least one function related to the image, based on the region (the region of interest) for performing the at least one function related to the image.

Hereinafter, with reference to FIGS. 9, 10A, 10B, 11, and 12, a method for determining a region of interest for at least one function related to an image, and performing the at least one function related to the image based on the determined region of interest will be described.

Figure 9:
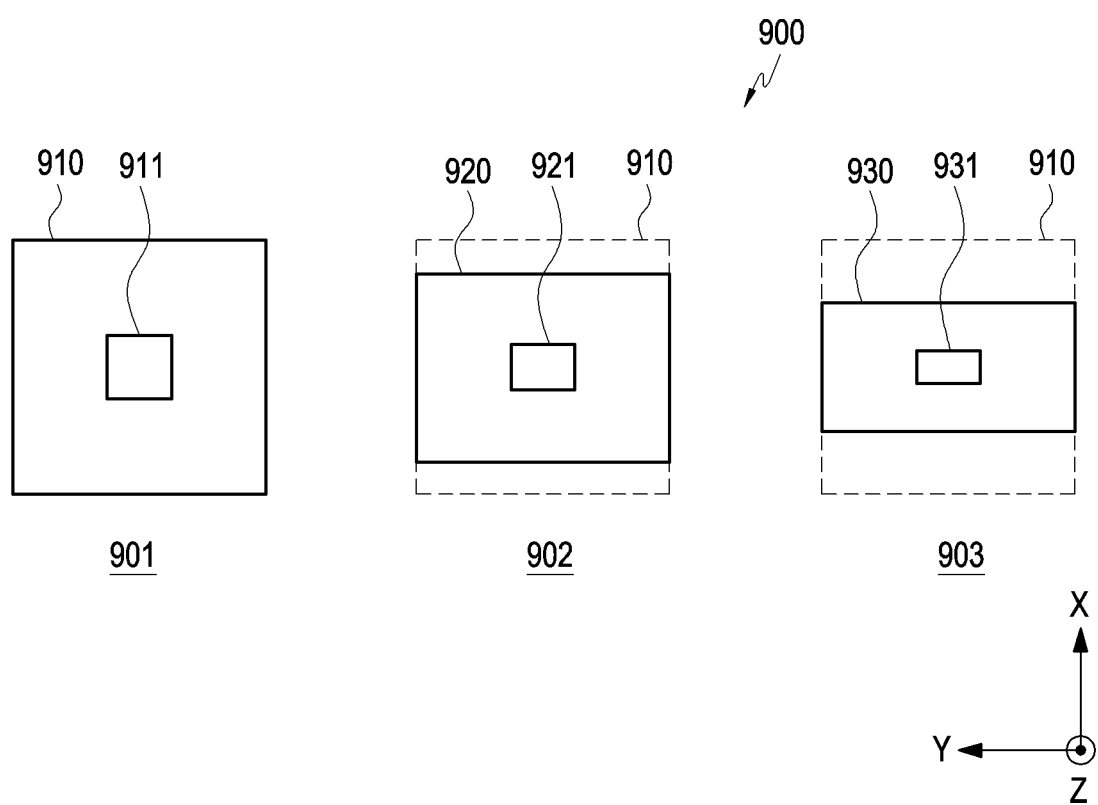
FIG. 9 is a diagram illustrating a method for determining a region of interest for an auto focus (AF) function according to an embodiment of the disclosure.

FIG. 9 is a diagram 900 illustrating a method for determining a region of interest for an AF function according to an embodiment of the disclosure.

Figure 10A:
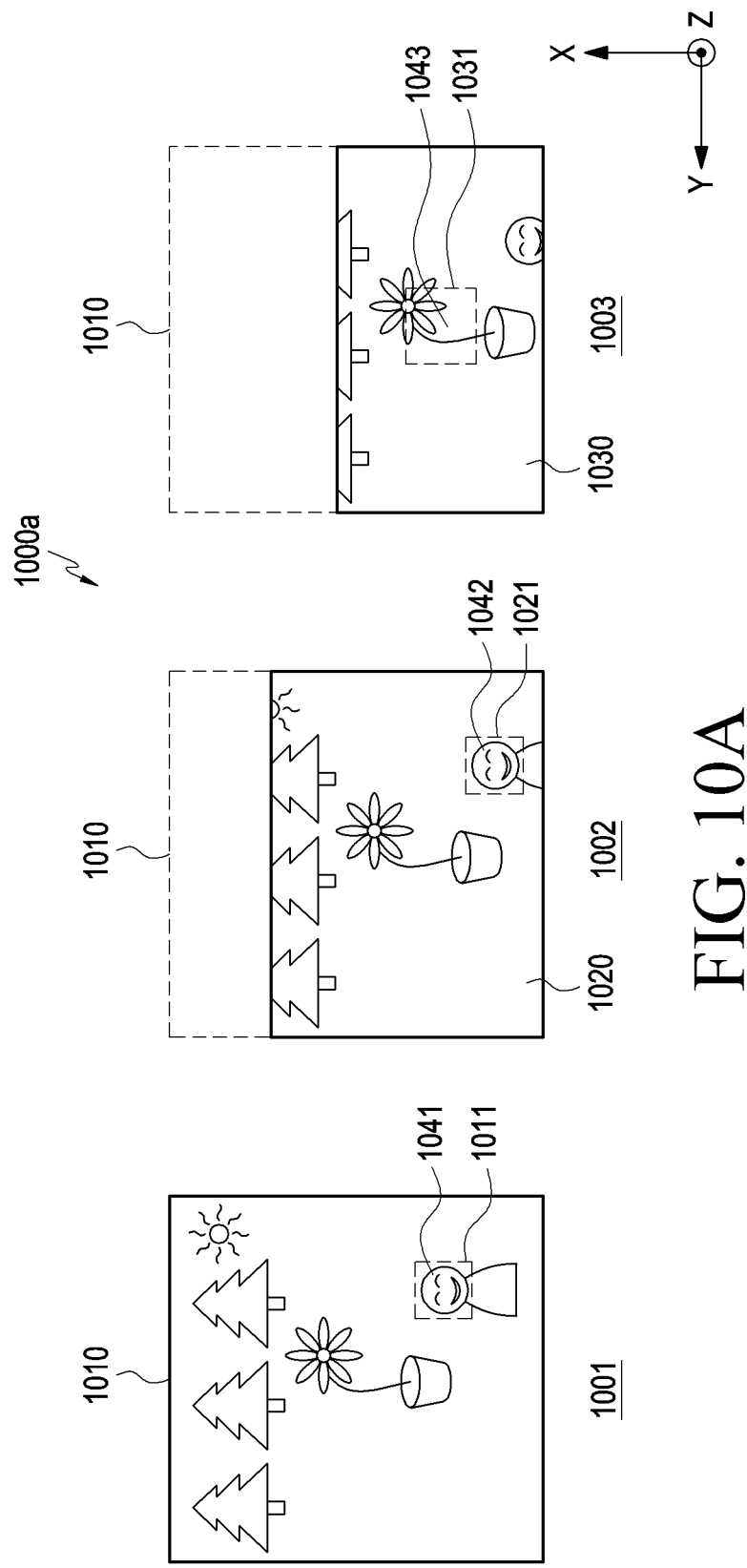
FIGS. 10A and 10B are diagrams illustrating a method for determining a region of interest for an AF function according to various embodiments of the disclosure.
Figure 10B:
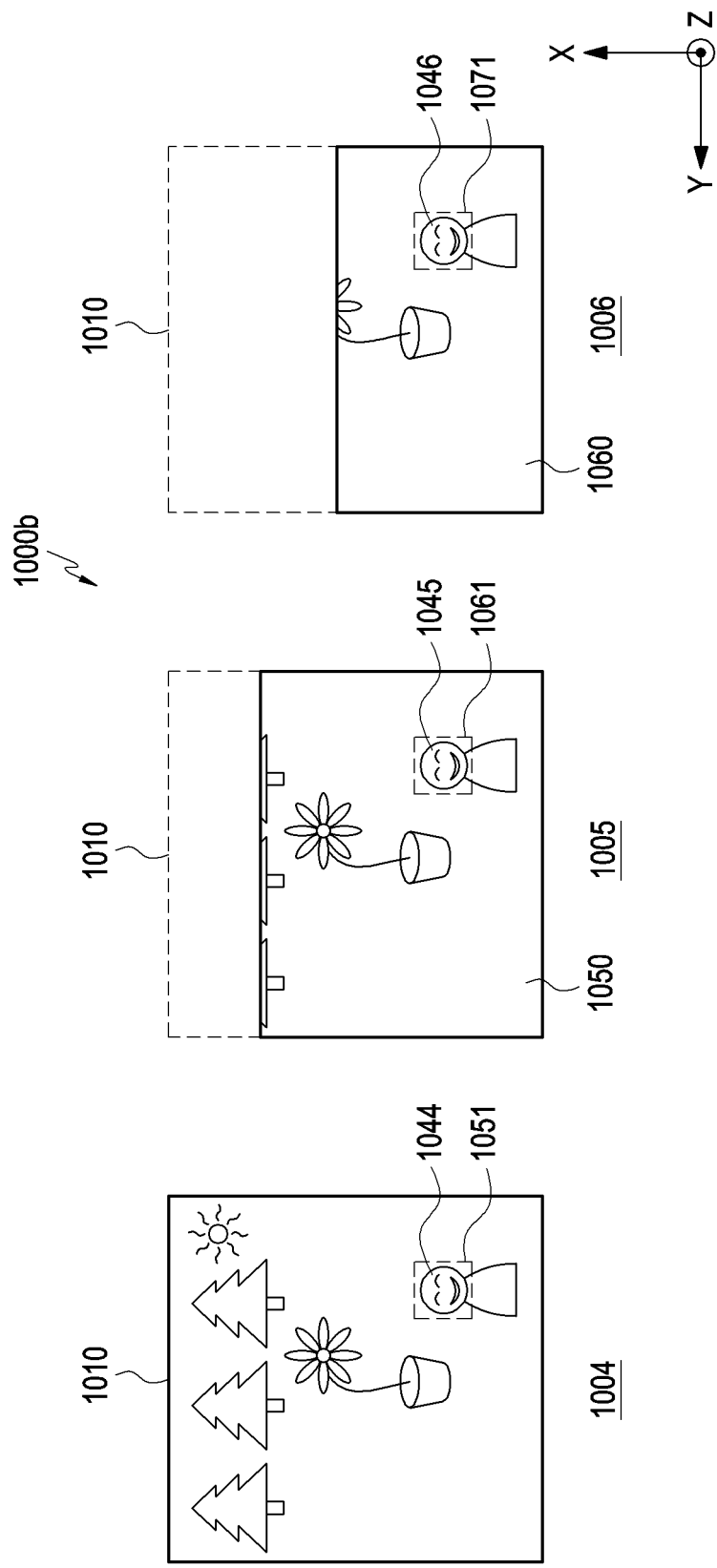

FIGS. 10A and 10B are diagrams 1000a and 1000b illustrating a method for determining a region of interest for an AF function according to various embodiments of the disclosure.

Referring to FIGS. 9, 10A, and 10B, in an embodiment of the disclosure, the processor 550 may determine a region of interest for an AF function within a first image part corresponding to a display region of a display. For example, the processor 550 may determine, within the first image part, a region specified by a user input, a region in which a face is detected, or a screen center region as the region of interest for the AF function.

In an embodiment of the disclosure, the processor 550 may determine the region specified by the user input as the region of interest for the AF function. For example, the processor 550 may identify a position touched by a user (e.g., a user's finger or an electronic pen) within the first image part. The processor 550 may determine, within the first image part, as the region of interest for the AF function, a region (e.g., a region centered on the touched position and having an area corresponding to about ⅒ of an area of the display region (or the first image part) of the display) having a specified area with reference to the touched position. For another example, when at least a part of the region touched by the user within the first image part overlaps a region including an object within the first image part, the processor 550 may determine the region including the object within the first image part, as the region of interest for the AF function. In an embodiment of the disclosure, after the region including the object within the first image part is determined as the region of interest for the AF function, the processor 550 may track a moving object within the first image part. The processor 550 may track the object so as to determine, as the region of interest for the AF function, a region including the moving object within the first image part.

In an embodiment of the disclosure, the processor 550 may determine the region in which the face is detected, as the region of interest for the AF function. For example, the processor 550 may detect a face within the first image part by using a face detection algorithm. The processor 550 may determine the region in which the face is detected (e.g., a region including a face), within the first image part, as the region of interest for the AF function.

In an embodiment of the disclosure, the processor 550 may determine the screen center region as the region of interest for the AF function. In an embodiment of the disclosure, the processor 550 may obtain a center of the first image part. The processor 550 may determine, within the first image part, as the region of interest for the AF function, a region (e.g., a region having an area corresponding to about 1/10 of an area of the display region (or the first image part) of the display with reference to the center of the first image part) having a specified area with reference to the center of the first image part. For example, reference numerals 901, 902, and 903 of FIG. 9 may sequentially indicate first image parts determined when the display 510 is drawn into the electronic device 101 in a state in which the display is maximally drawn out of the electronic device 101 (e.g., when the display 510 is drawn into the electronic device 101 in the −X axis direction). As shown by reference numeral 901 of FIG. 9, when a horizontal/vertical ratio of the display region of the display is 1:1, the processor 550 may determine, as the region of interest for the AF function, a region 911 having a specified area with reference to the center of a first image part 910 corresponding to the display region of the display. As shown by reference numeral 902 of FIG. 9, when a horizontal/vertical ratio of the display region of the display is 4:3, the processor 550 may determine, as the region of interest for the AF function, a region 921 having a specified area with reference to the center of a first image part 920 corresponding to the display region of the display. As shown by reference numeral 903 of FIG. 9, when a horizontal/vertical ratio of the display region of the display is 16:9, the processor 550 may determine, as the region of interest for the AF function, a region 931 having a specified area with reference to the center of a first image part 930 corresponding to the display region of the display. In an embodiment of the disclosure, as shown by reference numerals 901 to 903, when an area of the first image part is reduced, the processor 550 may determine, as the region of interest for the AF function, a region having the reduced area with reference to the center of the first image part, so as to correspond to (e.g., be proportional to) the reduced area of the first image part. However, the disclosure is not limited thereto, and even when the area of the first image part is reduced, the processor 550 may determine a region having a fixed area with reference to the center of the first image part as the region of interest for the AF function.

In an embodiment of the disclosure, the processor 550 may set a priority between the region specified by the user input, the region in which the face is detected, and the screen center region, in order to determine the region of interest for the AF function.

In an embodiment of the disclosure, in order to determine the region of interest for the AF function, the processor 550 may set a first priority (e.g., a highest priority) to the region specified by the user input, a second priority to the region in which the face is detected, and a third priority (e.g., a lowest priority) to the screen center region. When the first image part includes at least two of the regions specified by the user input, the region in which the face is detected, and the screen center region, the processor 550 may determine the region of interest for the AF function, based on the priority.

For example, reference numerals 1001, 1002, and 1003 of FIG. 10A may be diagrams sequentially illustrating a method for determining a region of interest for an AF function, based on a priority, when the display 510 is drawn into the electronic device 101 in a state in which the display is maximally drawn out of the electronic device 101 (e.g., when the display 510 is drawn into the electronic device 101 in the −X axis direction). In FIG. 10A, a first image part may be a region having a horizontal/vertical ratio equal to a horizontal/vertical ratio of a display region of the display, with reference to the center of an entire image region (e.g., an image acquired through the entire region of the image sensor), in the entire image region. As shown by reference numeral 1001 of FIG. 10A, when the horizontal/vertical ratio of the display region of the display is 1:1, the processor 550 may determine a first image part 1010 corresponding to the display region of the display. When a face 1041 is detected within the first image part 1010 and a user input for specifying a region of interest for an AF function is not received, the processor 550 may determine a region 1011 (e.g., a region including the face 1041) in which the face 1041 is detected, as the region of interest for the AF function, preferentially to a region having a specified area with reference to the center of the first image part 1010. As shown by reference numeral 1002 of FIG. 10A, when the horizontal/vertical ratio of the display region of the display is 4:3, the processor 550 may determine a first image part 1020 corresponding to the display region of the display. When a face 1042 is detected within the first image part 1020 and a user input for specifying a region of interest for an AF function is not received, the processor 550 may determine a region 1021 (e.g., a region including the face 1042) in which the face 1042 is detected, as the region of interest for the AF function, preferentially to a region having a specified area with reference to the center of the first image part 1020. As shown by reference numeral 1003 of FIG. 10A, when the horizontal/vertical ratio of the display region of the display is 16:9, the processor 550 may determine a first image part 1030 corresponding to the display region of the display. When a face is not detected within the first image part 1030 and a user input for specifying a region of interest for an AF function is not received, the processor 550 may determine a region 1031 having a specified area with reference to a center 1043 of the first image part 1030 as the region of interest for the AF function.

For another example, reference numerals 1004, 1005, and 1006 of FIG. 10B may be diagrams sequentially illustrating a method for determining a region of interest for an AF function, based on a priority, when the display 510 is drawn into the electronic device 101 in a state in which the display is maximally drawn out of the electronic device 101 (e.g., when the display 510 is drawn into the electronic device 101 in the −X axis direction). In FIG. 10B, a first image part may be a region which includes a boundary line in a direction in which a display region of the display is reduced with reference the center of an entire image region among boundary lines of the entire image region in the entire image region, and has a horizontal/vertical ratio equal to a horizontal/vertical ratio of the display region of the display. As shown by reference numeral 1004 of FIG. 10B, when the horizontal/vertical ratio of the display region of the display is 1:1, the processor 550 may determine the first image part 1010 corresponding to the display region of the display. When a face 1044 is detected within the first image part 1010 and a user input for specifying a region of interest for an AF function is not received, the processor 550 may determine a region 1051 (e.g., a region including the face 1044) in which the face 1044 is detected, as the region of interest for the AF function, preferentially to a region having a specified area with reference to the center of the first image part 1010. As shown by reference numeral 1005 of FIG. 10B, when the horizontal/vertical ratio of the display region of the display is 4:3, the processor 550 may determine a first image part 1050 corresponding to the display region of the display. When a face 1045 is detected within the first image part 1050 and a user input for specifying a region of interest for an AF function is not received, the processor 550 may determine a region 1061 (e.g., a region including the face 1045) in which the face 1045 is detected, as the region of interest for the AF function, preferentially to a region having a specified area with reference to the center of the first image part 1050. As shown by reference numeral 1006 of FIG. 10B, when the horizontal/vertical ratio of the display region of the display is 16:9, the processor may determine a first image part 1060 corresponding to the display region of the display. When a face 1046 is detected within the first image part 1060 and a user input for specifying a region of interest for an AF function is not received, the processor may determine a region 1071 (e.g., a region including the face 1046) in which the face 1046 is detected, as the region of interest for the AF function, preferentially to a region having a specified area with reference to the center of the first image part 1060.

In an embodiment of the disclosure, when a region of interest for an AF function is determined, the processor 550 may perform the AF function, based on the region of interest for the AF function. For example, the processor 550 may configure (e.g., adjust a position of a lens for focus) a camera setting, based on a distance between the camera module 180 and a subject (e.g., a person and/or an object) which is an object of the region of interest for the AF function. However, a method for performing an AF function based on a region of interest for the AF function is not limited to the above-described example. When a camera setting is set, the processor 550 may acquire an image through the camera module 180 according to the set camera setting.

Figure 11:
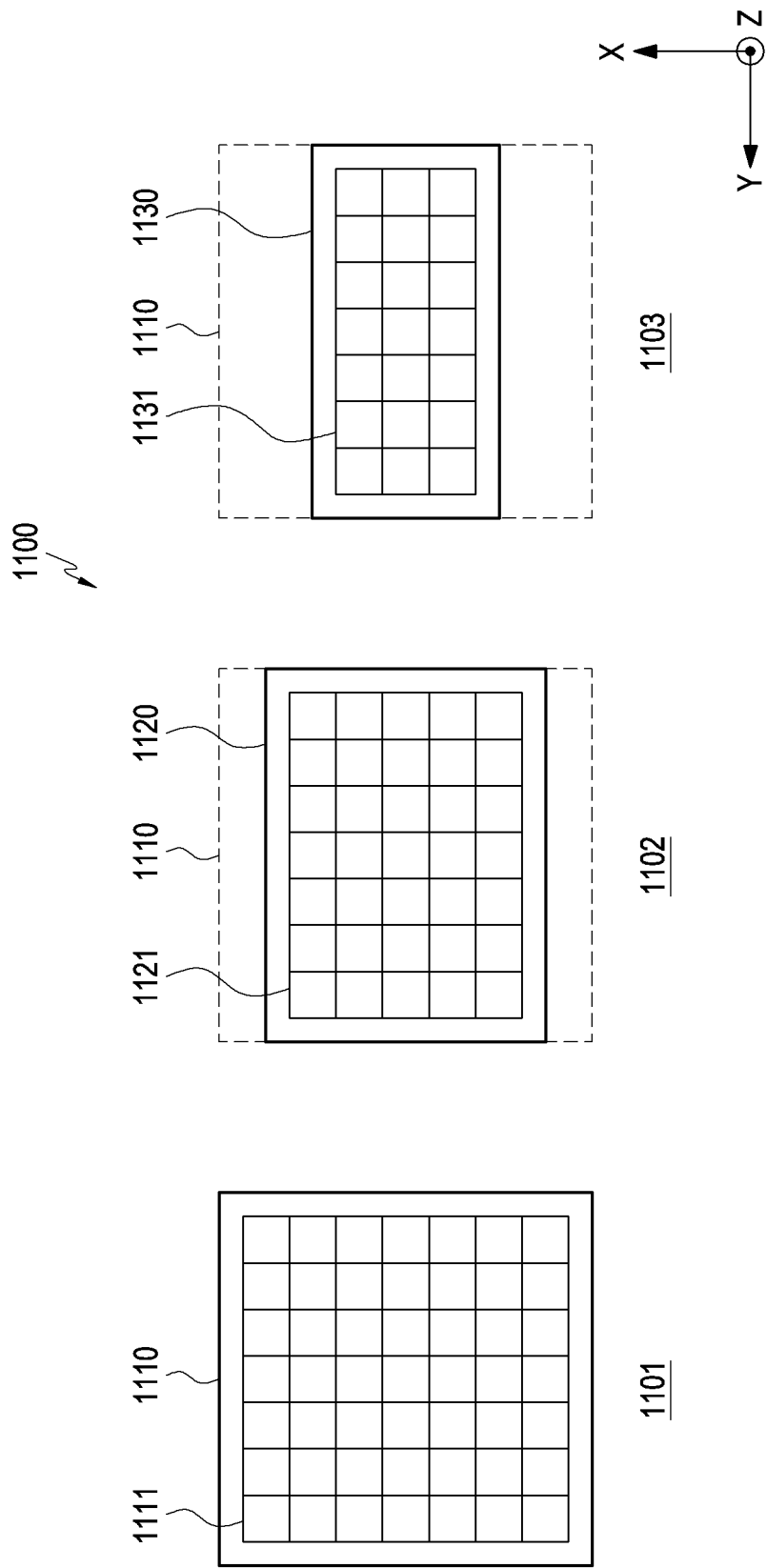
FIG. 11 is a diagram illustrating a method for determining a region of interest for an AE function according to an embodiment of the disclosure.

FIG. 11 is a diagram 1100 illustrating a method for determining a region of interest for an AE function according to an embodiment of the disclosure.

Referring to FIG. 11, in an embodiment of the disclosure, the processor 550 may determine a region of interest for an auto exposure (AE) function within a first image part corresponding to a display region of a display.

In an embodiment of the disclosure, the processor 550 may determine a region substantially equal to the first image part as the region of interest for the AE function. For example, the processor 550 may determine, as the region of interest for the AE function, a part equal to the first image part or a remaining part other than an outermost part (e.g., an edge part of the first image part) of the first image part within the first image part. Reference numerals 1101, 1102, and 1103 of FIG. 11 may sequentially indicate first image parts determined when the display 510 is drawn into the electronic device 101 in a state in which the display is maximally drawn out of the electronic device 101 (e.g., when the display 510 is drawn into the electronic device 101 in the −X axis direction). As shown by reference numeral 1101 of FIG. 11, when a horizontal/vertical ratio of the display region of the display is 1:1, the processor 550 may determine, as the region of interest for the AE function, a region 1111 (e.g., a region other than an outermost part of a first image part 1110 within the first image part 1110) substantially equal to the first image part 1110 corresponding to the display region of the display. As shown by reference numeral 1102 of FIG. 11, when the horizontal/vertical ratio of the display region of the display is 4:3, the processor 550 may determine, as the region of interest for the AE function, a region 1121 substantially equal to a first image part 1120 corresponding to the display region of the display. As shown by reference numeral 1103 of FIG. 11, when the horizontal/vertical ratio of the display region of the display is 16:9, the processor 550 may determine, as the region of interest for the AE function, a region 1131 substantially equal to a first image part 1130 corresponding to the display region of the display.

In an embodiment of the disclosure, when the region of interest for the AE function is determined, the processor 550 may perform the AF function, based on the region of interest for the AE function.

In an embodiment of the disclosure, the processor 550 may set a weight for the AE function with respect to the region of interest. In an embodiment of the disclosure, the processor 550 may set (e.g., assign) different weights with respect to a region specified by a user input, a region in which a face is detected, a screen center region, and a background region, within the region of interest. For example, when a region of interest (e.g., a region of interest 1111, a region of interest 1121, or a region of interest 1131) is set to be divided into a plurality of sub-regions (e.g., a plurality of sub-regions in the form of a grid) as shown in FIG. 11, the processor 550 may assign a high weight in the order of first sub-regions including a region specified by a user input, second sub-regions including a region in which a face is detected, third sub-regions including a screen center region, and fourth sub-regions including a background region. FIG. 11 illustrates that the number of the plurality of sub-regions is reduced as an area of the first image part is reduced, but the disclosure is not limited thereto. For example, as an area of the first image part is reduced, the number of the plurality of sub-regions may be maintained, and an area of each of the plurality of sub-regions may be reduced to correspond to the reduction in the area of the first image part.

In an embodiment of the disclosure, the processor 550 may perform the AE function, based on a weight set for the region of interest. For example, the processor 550 may set a camera setting for exposure (e.g., adjust an exposure time and/or camera sensitivity (international organization for standardization (ISO)), within the region of interest, based on brightness information of the first sub-regions to which a first weight (e.g., the highest weight) is set, brightness information of the second sub-regions to which a second weight (e.g., the second highest weight) is set, brightness information of the third sub-regions to which a third weight (e.g., the third highest weight) is set, and brightness information of the fourth sub-regions to which a fourth weight (e.g., the lowest weight) is set. However, a method for performing an AE function based on a region of interest is not limited to the above-described example. When a camera setting is set, the processor 550 may acquire an image through the camera module 180 according to the set camera setting.

Figure 12:
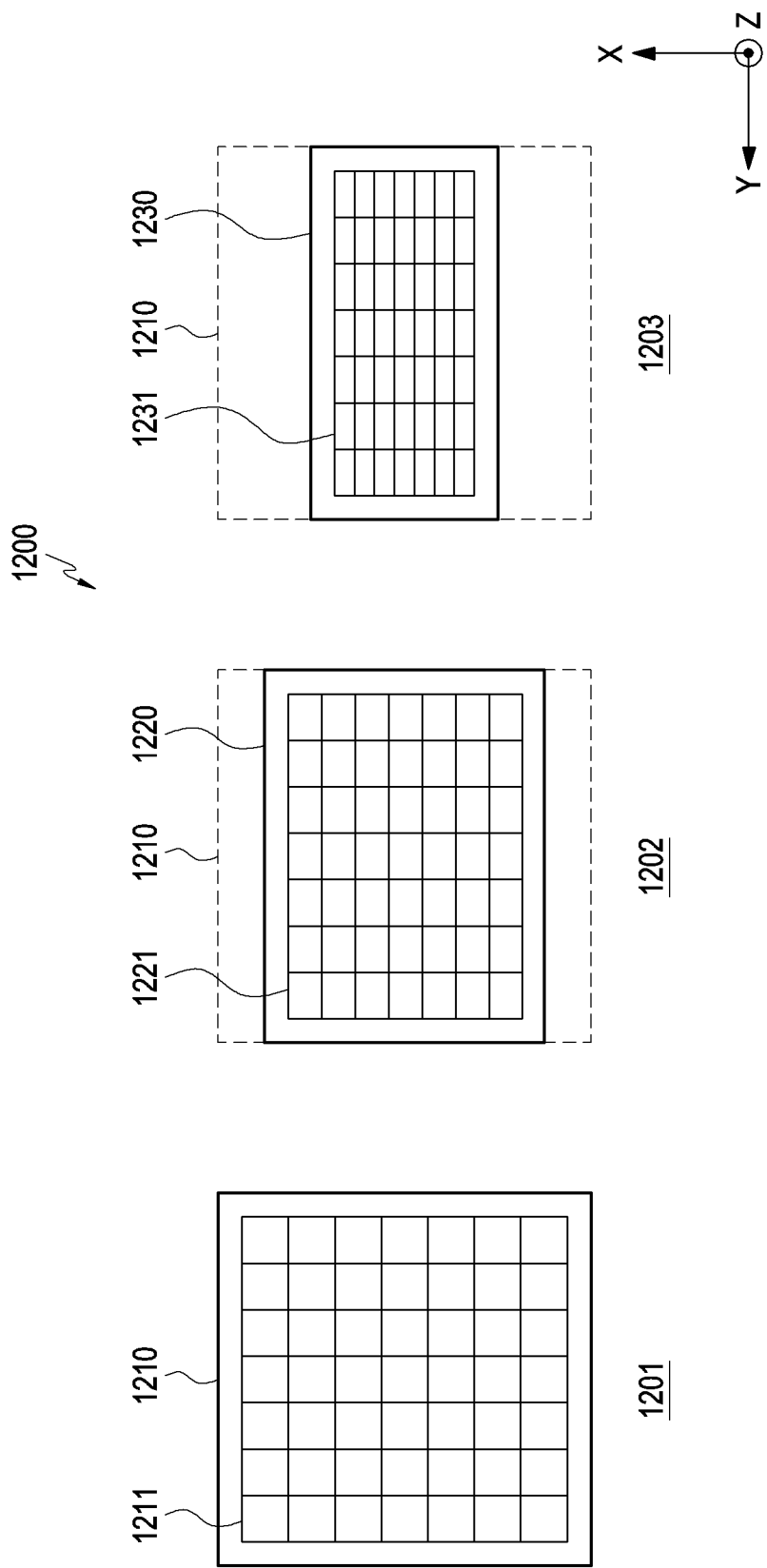
FIG. 12 is a diagram illustrating a method for determining a region of interest for an auto white balance (AWB) function according to an embodiment of the disclosure.

FIG. 12 is a diagram 1200 illustrating a method for determining a region of interest for an AWB function according to an embodiment of the disclosure.

Referring to FIG. 12, in an embodiment of the disclosure, the processor 550 may determine a region of interest for an auto white balance (AWB) function within a first image part corresponding to a display region of a display.

In an embodiment of the disclosure, the processor 550 may determine a region substantially equal to the first image part as the region of interest for the AWB function. For example, the processor 550 may determine, as the region of interest for the AWB function, a part equal to the first image part or a remaining part other than an outermost part (e.g., an edge part of the first image part) of the first image part within the first image part. Reference numerals 1201, 1202, and 1203 of FIG. 12 may sequentially indicate first image parts determined when the display 510 is drawn into the electronic device 101 in a state in which the display is maximally drawn out of the electronic device 101 (e.g., when the display 510 is drawn into the electronic device 101 in the −X axis direction). As shown by reference numeral 1201 of FIG. 12, when a horizontal/vertical ratio of the display region of the display is 1:1, the processor 550 may determine, as the region of interest for the AWB function, a region 1211 (e.g., a region other than an outermost part of a first image part 1210 within the first image part 1210) substantially equal to the first image part 1210 corresponding to the display region of the display. As shown by reference numeral 1202 of FIG. 12, when the horizontal/vertical ratio of the display region of the display is 4:3, the processor 550 may determine, as the region of interest for the AWB function, a region 1221 substantially equal to a first image part 1220 corresponding to the display region of the display. As shown by reference numeral 1203 of FIG. 12, when the horizontal/vertical ratio of the display region of the display is 16:9, the processor 550 may determine, as the region of interest for the AWB function, a region 1231 substantially equal to a first image part 1230 corresponding to the display region of the display.

In an embodiment of the disclosure, when the region of interest for the AWB function is determined, the processor 550 may perform the AWB function, based on the region of interest for the AWB function. For example, when a region of interest (e.g., a region of interest 1211, a region of interest 1221, or a region of interest 1231) is set to be divided into a plurality of sub-regions as shown in FIG. 12, the processor 550 may identify sub-regions having an achromatic color among the plurality of sub-regions, based on color information of each of the plurality of sub-regions. The processor 550 may acquire a gain (e.g., an R gain and a B gain) for setting white balance of a first image part, based on color information of the sub-regions having an achromatic color. The processor 550 may adjust (or maintain) white balance for the first image part, based on the acquired gain.

In the above-described examples, the AF function, the AE function, and the AWB function are exemplified as at least one function related to an image, but the disclosure is not limited thereto. In an embodiment of the disclosure, the processor 550 may determine, within a first image part corresponding to a display region of the display, a region of interest for performing a face detection (FD) function and/or an object tracking (OT) function, and perform the FD function and/or the OT function within the determined region of interest.

In an embodiment of the disclosure, the processor 550 may perform the at least one function related to the image, and then display the image through the display 510. For example, when a camera setting is set as the AF function and/or the AE function is performed, the processor 550 may acquire an image through the camera module 520, based on the set camera setting. The processor 550 may display, through the display 510, the first image part corresponding to the display region of the display within the acquired image. For another example, the processor 550 may display, through the display 510, a first image part (e.g., an image corrected by performing the AWB function on the first image part) acquired by performing the AWB function.

In an embodiment of the disclosure, the processor 550 may store the first image part displayed through the display 510 in the memory 540, based on a user input (e.g., a user input for capturing an image).

Figure 13:
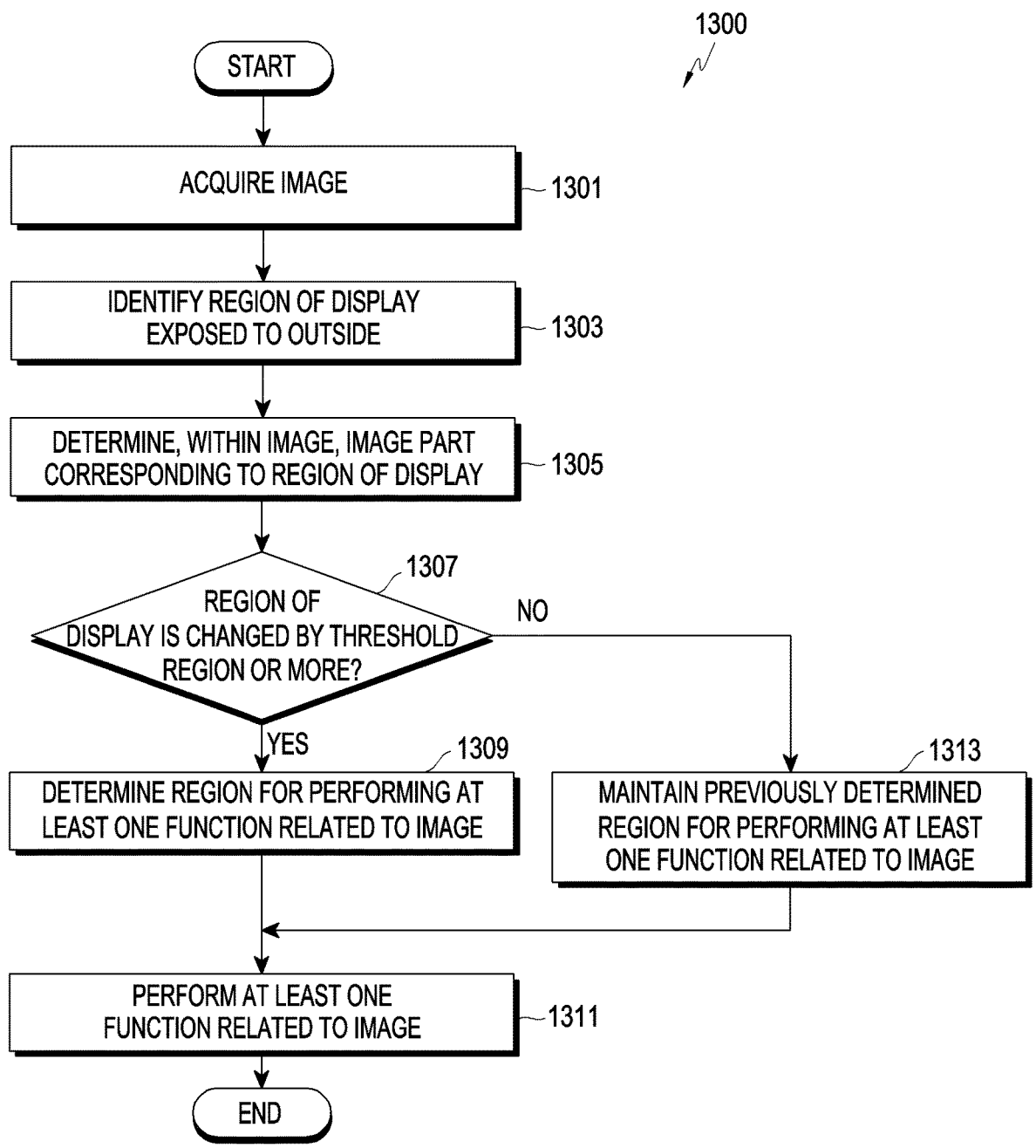
FIG. 13 is a flowchart illustrating a method for providing an image according to an embodiment of the disclosure.

FIG. 13 is a flowchart 1300 illustrating a method for providing an image according to an embodiment of the disclosure.

Referring to FIG. 13, in operation 1301, in an embodiment of the disclosure, the processor 550 may acquire an image through an image sensor (e.g., the image sensor 230) of the camera module 520.

At least a part of operation 1301 is the same as or similar to at least a part of operation 601 of FIG. 6, and thus a detailed description thereof will be omitted.

In operation 1303, in an embodiment of the disclosure, the processor 550 may identify a region (a display region of a display) of the display exposed to the outside of the electronic device 101, through the sensor 530.

At least a part of operation 1303 is the same as or similar to at least a part of operation 603 of FIG. 6, and thus a detailed description thereof will be omitted.

In operation 1305, in an embodiment of the disclosure, the processor 550 may determine an image part (a first image part) corresponding to the identified region (the display region of the display) of the display within the image.

At least a part of operation 1305 is the same as or similar to at least a part of operation 605 of FIG. 6, and thus a detailed description thereof will be omitted.

In operation 1307, in an embodiment of the disclosure, the processor 550 may determine whether the region (the display region of the display) of the display is changed by a threshold region or more. For example, the processor 550 may determine whether an amount of change in the region exposed to the outside (or an amount of change in a vertical length h of the display region of the display 510) has been changed by the threshold region or more as the display 550 is drawn into the electronic device 101 or drawn out of the electronic device 101.

When it is determined in operation 1307 that the display region of the display is changed by the threshold region or more, in operation 1309, in an embodiment of the disclosure, the processor 550 may determine a region (a region of interest) for performing at least one function related to the image within the first image part corresponding to the display region of the display.

At least a part of operation 1309 is the same as or similar to at least a part of operation 607 of FIG. 6, and thus a detailed description thereof will be omitted.

In operation 1311, in an embodiment of the disclosure, the processor 550 may perform the at least one function related to the image, based on the region (the region of interest) for performing the at least one function related to the image.

At least a part of operation 1311 is the same as or similar to at least a part of operation 609 of FIG. 6, and thus a detailed description thereof will be omitted.

When it is determined in operation 1307 that the display region of the display is not changed by the threshold region or more, in operation 1313, in an embodiment of the disclosure, the processor 550 may maintain the previously determined region (the region of interest) for performing the at least one function related to the image. For example, the processor 550 may maintain (or determine) the region of interest for performing the at least one function related to the image, which has been determined before changing the display region of the display, as the region of interest for performing the at least one function related to the image after changing the display region of the display.

In operation 1307, when the previously determined region of interest for performing the at least one function related to the image is maintained, in operation 1311, in an embodiment of the disclosure, the processor 550 may perform the at least one function related to the image, based on the maintained region of interest.

In an embodiment of the disclosure, the processor 550 determines (e.g., re-sets) the region of interest for performing the at least one function related to the image only when the display region of the display is changed by the threshold region or more, so that power consumed to perform an image-providing operation may be reduced, and a resource for performing the image-providing operation may be saved.

Figure 14:
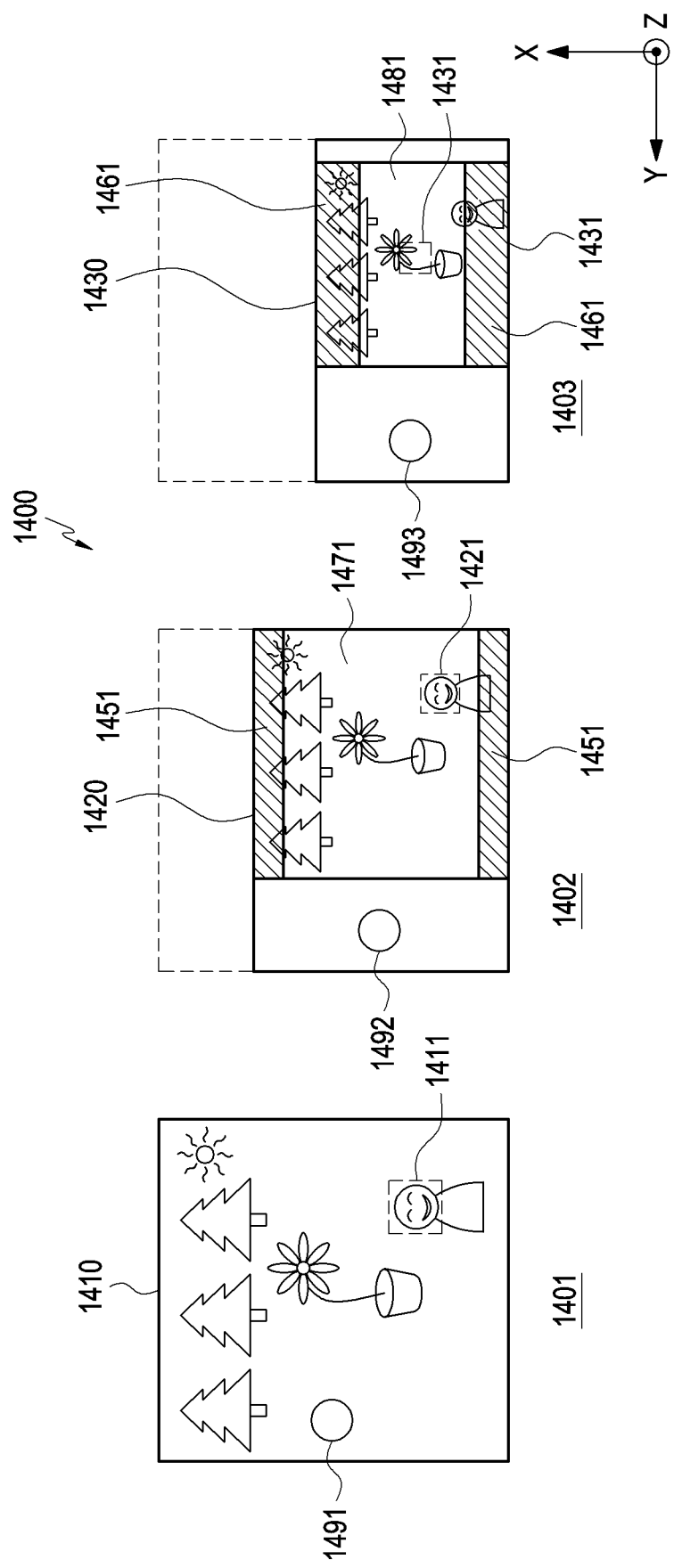
FIG. 14 is a diagram illustrating a method for providing an image according to an embodiment of the disclosure.

FIG. 14 is a diagram 1400 illustrating a method for providing an image according to an embodiment of the disclosure.

Referring to FIG. 14, in an embodiment of the disclosure, when an image aspect ratio is set to a full ratio, the processor 550 may display an entire image acquired from an image sensor (e.g., the entire region of the image sensor) through the display 510. When the entire image is displayed, the processor 550 may control the display 510 such that a first image part corresponding to a display region of the display is distinguished from a region other than the first image part in the entire image. For example, when the image aspect ratio is set to the full ratio, the processor 550 may acquire an image from the entire region of the image sensor. The processor 550 may identify the first image part corresponding to the display region of the display within the acquired image. The processor 550 may control the display 510 such that when the acquired image is displayed, a region other than the first image part within the acquired image is displayed darker than the first image part. However, a method for controlling the display 510 such that a first image part is distinguished from a region other than the first image part in an entire image is not limited to the example of controlling the display 510 such that the region other than the first image part within the acquired image is displayed darker than the first image part.

In an embodiment of the disclosure, reference numerals 1401, 1402, and 1403 of FIG. 14 may sequentially indicate images displayed through the display 510 when the display 510 is drawn into the electronic device 101 in a state in which the display is maximally drawn out of the electronic device 101 and the image aspect ratio is set to the full ratio. As shown by reference numeral 1401, when a horizontal/vertical ratio of the display region of the display is 1:1 and a horizontal/vertical ratio of an image acquired through the image sensor is 1:1, the processor 550 may display an image 1410 acquired through the image sensor, through the display 510. As shown by reference numeral 1402, when the horizontal/vertical ratio of the display region of the display is 4:3, the processor 550 may display an image 1420 acquired through the image sensor, through the display 510. The processor 550 may control the display 510 such that when the image 1420 is displayed, a region 1451 other than a first image part 1471 corresponding to the display region of the display within the image 1420 is displayed darker than the first image part 1471. As shown by reference numeral 1403, when the horizontal/vertical ratio of the display region of the display is 16:9, the processor 550 may display an image 1430 acquired through the image sensor, through the display 510. The processor 550 may control the display 510 such that when the image 1430 is displayed, a region 1461 other than a first image part 1481 corresponding to the display region of the display within the image 1430 is displayed darker than the first image part 1481.

In an embodiment of the disclosure, reference numerals 1491, 1492, and 1493 may indicate objects for capturing an image. In an embodiment of the disclosure, when a user input for an object for capturing an image is received, the processor 550 may store a first image part (e.g., the first image part 1410, the first image part 1420, or the first image part 1430) in the memory 540.

Although not described above, in an embodiment of the disclosure, when the display 510 is drawn out of the electronic device 101 or drawn into the electronic device 101 in the same or similar manner as described with reference to FIGS. 6, 7, 8, 9, 10A, 10B, 11, 12, and 13, the processor 550 may determine a first image part corresponding to a display region of the display, and determine a region of interest (e.g., regions of interest 1411, 1421, and 1431 for an AF function) for performing at least one function related to an image within the first image part.

In an embodiment of the disclosure, when an entire image acquired from an image sensor (e.g., the entire region of the image sensor) is displayed, the processor 550 may control the display 510 such that the first image part corresponding to the display region of the display is distinguished from a region other than the first image part in the entire image, so as to provide, to a user, information on an image region to be stored in the memory 540 by image capturing, and enable the user to set a better composition or image aspect ratio.

A method for providing an image by an electronic device according to various embodiments of the disclosure may include acquiring an image through an image sensor included in a camera module of the electronic device, identifying, through at least one sensor of the electronic device, a region of a flexible display exposed to the outside in the flexible display of the electronic device, the region exposed to the outside being reduced as the flexible display is drawn into the electronic device, and the region exposed to the outside being expanded as the flexible display is drawn out of the electronic device, determining, within the image, an image part corresponding to the identified region of the flexible display, determining, within the determined image part, a region for performing at least one function related to the image, and performing the at least one function, based on the determined region.

In various embodiments of the disclosure, the acquiring of the image may include acquiring the image through an entire region of the image sensor, based on a user input for setting an image aspect ratio to a full ratio.

In various embodiments of the disclosure, the identifying of the region of the flexible display may include identifying a horizontal/vertical ratio of the region of the flexible display exposed to the outside, and the determining of the image part may include determining, within the image, as the image part, a region having a horizontal/vertical ratio equal to the horizontal/vertical ratio of the region of the flexible display, with reference to a center of the image.

In various embodiments of the disclosure, the at least one function related to the image may include at least one of an AF function, an AE function, an AWB function, a FD function, or an OT function.

In various embodiments of the disclosure, the determining of the region for performing the at least one function related to the image may include determining, when the function related to the image includes the AF function, within the determined image part, a region specified by a user input, a region in which a face is detected, or a screen center region, as a region of interest for the AF function.

In various embodiments of the disclosure, the determining of the region specified by the user input, the region in which the face is detected, or the screen center region as the region of interest for the AF function may include determining the region of interest for the AF function, based on a priority between the region specified by the user input, the region in which the face is detected, and the screen center region.

In various embodiments of the disclosure, the determining of the region for performing the at least one function related to the image may include determining, when the function related to the image includes the AE function and/or the AWB function, a region substantially equal to the determined image part as a region of interest for the AE function and/or AWB function.

In various embodiments of the disclosure, the method may further include determining whether the region of the flexible display is changed by a threshold region or more, and the determining of the region for performing the at least one function related to the image may include determining the region for performing the at least one function related to the image within the determined image part, based on determining that the region of the flexible display has been changed by the threshold region or more.

In various embodiments of the disclosure, the method may further include performing the at least one function, so as to set a setting related to the camera module or correct the image.

In various embodiments of the disclosure, the method may further include displaying the image through the flexible display such that the determined image part and a region other than the determined image part within the image are distinguished from each other.

In addition, a structure of data used in the above-described embodiment of the disclosure may be recorded in a computer-readable recording medium via various means. The computer-readable recording medium includes storage media, such as a magnetic storage medium (e.g., an ROM, a floppy disk, a hard disk, or the like), and an optical reading medium (e.g., a CD-ROM, digital video disc (DVD), or the like).

What is claimed is:

1. An electronic device comprising:
a flexible display in which a region exposed to an outside is reduced as the flexible display is drawn into the electronic device and the region exposed to the outside is expanded as the flexible display is drawn out of the electronic device;
a camera module comprising an image sensor;
at least one sensor; and
at least one processor electrically connected to the flexible display, the camera module, and the at least one sensor, wherein the at least one processor is configured to:
acquire an image through the image sensor,
identify the region of the flexible display exposed to the outside, through the at least one sensor,
determine, within the image, an image part corresponding to the identified region of the flexible display,
determine, within the determined image part, a region for performing at least one function related to the image, and
perform the at least one function, based on the determined region.

2. The electronic device of claim 1, wherein the at least one processor is configured to acquire the image through an entire region of the image sensor, based on a user input for setting an image aspect ratio to a full ratio.

3. The electronic device of claim 1, wherein the at least one processor is configured to:
identify a horizontal/vertical ratio of the region of the flexible display exposed to the outside, and
determine, within the image, as the image part, a region having a horizontal/vertical ratio equal to the horizontal/vertical ratio of the region of the flexible display, with reference to a center of the image.

4. The electronic device of claim 1, wherein the at least one function related to the image comprises at least one of an auto focus (AF) function, an auto exposure (AE) function, an auto white balance (AWB) function, a face detection (FD) function, or an object tracking (OT) function.

5. The electronic device of claim 4, wherein the at least one processor is configured to, when the function related to the image comprises the AF function, determine, within the determined image part, a region specified by a user input, a region in which a face is detected, or a screen center region as a region of interest for the AF function.

6. The electronic device of claim 5, wherein the at least one processor is configured to determine the region of interest for the AF function, based on a priority between the region specified by the user input, the region in which the face is detected, and the screen center region.

7. The electronic device of claim 4, wherein the at least one processor is configured to, when the function related to the image comprises the AE function and/or the AWB function, determine a region substantially equal to the determined image part as a region of interest for the AE function and/or AWB function.

8. The electronic device of claim 1, wherein the at least one processor is configured to:
determine whether the region of the flexible display is changed by a threshold region or more, and
determine the region for performing the at least one function related to the image within the determined image part, based on determining that the region of the flexible display has been changed by the threshold region or more.

9. The electronic device of claim 1, wherein the at least one processor is further configured to perform the at least one function, so as to set a setting related to the camera module or correct the image.

10. The electronic device of claim 1, wherein the at least one processor is further configured to display the image through the flexible display such that the determined image part and a region other than the determined image part within the image are distinguished from each other.

11. A method for providing an image by an electronic device, the method comprising:
acquiring an image through an image sensor included in a camera module of the electronic device;

identifying, through at least one sensor of the electronic device, a region of a flexible display exposed to an outside in the flexible display of the electronic device, the region exposed to the outside being reduced as the flexible display is drawn into the electronic device, and the region exposed to the outside being expanded as the flexible display is drawn out of the electronic device;

determining, within the image, an image part corresponding to the identified region of the flexible display;

determining, within the determined image part, a region for performing at least one function related to the image; and performing the at least one function, based on the determined region.

12. The method of claim 11, wherein the acquiring of the image comprises:

acquiring the image through an entire region of the image sensor, based on a user input for setting an image aspect ratio to a full ratio.

13. The method of claim 11, wherein the identifying of the region of the flexible display comprises identifying a horizontal/vertical ratio of the region of the flexible display exposed to the outside, and wherein the determining of the image part comprises determining, within the image, as the image part, a region having a horizontal/vertical ratio equal to the horizontal/vertical ratio of the region of the flexible display, with reference to a center of the image.

14. The method of claim 11, wherein the at least one function related to the image comprises at least one of an auto focus (AF) function, an auto exposure (AE) function, an auto white balance (AWB) function, a face detection (FD) function, or an object tracking (OT) function.

15. The method of claim 14, wherein the determining of the region for performing the at least one function related to the image comprises:

determining, when the function related to the image comprises the AF function, within the determined image part, a region specified by a user input, a region in which a face is detected, or a screen center region, as a region of interest for the AF function.

16. The method of claim 15, wherein the determining of the region specified by the user input, the region in which the face is detected, or the screen center region as the region of interest for the AF function comprises:

determining the region of interest for the AF function, based on a priority between the region specified by the user input, the region in which the face is detected, and the screen center region.

17. The method of claim 14, wherein the determining of the region for performing the at least one function related to the image comprises:

determining, when the function related to the image comprises the AE function and/or the AWB function, a region substantially equal to the determined image part as a region of interest for the AE function and/or AWB function.

18. The method of claim 11, further comprising:

determining whether the region of the flexible display is changed by a threshold region or more, wherein the determining of the region for performing the at least one function related to the image comprises determining the region for performing the at least one function related to the image within the determined image part, based on determining that the region of the flexible display has been changed by the threshold region or more.

19. The method of claim 11, further comprising:

performing the at least one function, so as to set a setting related to the camera module or correct the image.

20. The method of claim 11, further comprising:

displaying the image through the flexible display such that the determined image part and a region other than the determined image part within the image are distinguished from each other.

* * * * *